(12) United States Patent
Goto et al.

(10) Patent No.: US 9,346,386 B2
(45) Date of Patent: May 24, 2016

(54) VEHICLE FLOOR MAT

(71) Applicants: HONDA ACCESS CORP., Niiza, Saitama (JP); HONDA MOTOR CO., LTD., Tokyo (JP)

(72) Inventors: Takashi Goto, Ashikaga (JP); Kana Harata, Sakura (JP); Tohru Ohba, Wako (JP); Tatsuya Shiono, Wako (JP); Hirobumi Kikuchi, Wako (JP); Mitsuyoshi Nakamura, Wako (JP)

(73) Assignees: HONDA ACCESS CORP., Niiza-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/673,154

(22) Filed: Mar. 30, 2015

(65) Prior Publication Data

US 2015/0203014 A1 Jul. 23, 2015

Related U.S. Application Data

(62) Division of application No. 13/544,289, filed on Jul. 9, 2012, now Pat. No. 9,016,756.

(30) Foreign Application Priority Data

Aug. 30, 2011 (JP) .................................. 2011-188015
Nov. 25, 2011 (JP) .................................. 2011-256891

(51) Int. Cl.
*B60N 3/04* (2006.01)
(52) U.S. Cl.
CPC . *B60N 3/046* (2013.01); *Y10T 16/10* (2015.01)
(58) Field of Classification Search
CPC .................................. B60N 3/046; B60N 3/048
USPC ......................................................... 296/97.23
See application file for complete search history.

(56) References Cited

U.S. PATENT DOCUMENTS

| | | | |
|---|---|---|---|
| 3,037,542 A | 6/1962 | Boyd | |
| 3,091,795 A | 6/1963 | Budwig | |
| 5,168,604 A | 12/1992 | Boville | |
| 6,757,945 B2 | 7/2004 | Shibuya et al. | |

(Continued)

FOREIGN PATENT DOCUMENTS

| FR | WO 2012095823 A1 * | 7/2012 | ............ B60N 3/046 |
|---|---|---|---|
| JP | 11-230134 A | 8/1999 | |

(Continued)

*Primary Examiner* — Pinel Romain
(74) *Attorney, Agent, or Firm* — Westerman, Hattori, Daniels & Adrian, LLP

(57) ABSTRACT

Provided is a vehicle floor mat reducing a load on a mat main body. The vehicle floor mat includes at least one fastening device for fastening the mat main body to a vehicle. The fastening device includes a first fastening member fixed to the vehicle and a second fastening member fixed to the mat main body. The first fastening member includes a vertical rotating knob, and the second fastening member includes: an insertion receiving section for the rotating knob to be inserted thereinto and engaged therewith; and upper and lower half bodies sandwiching the mat main body and being connected to each other through a half body connecting portion for the rotating knob to be inserted thereinto and at least one outer connecting portion disposed outside the half body connecting portion provided around the insertion receiving section, thus improving a connecting strength between the upper and lower half bodies.

20 Claims, 22 Drawing Sheets

(56) References Cited

U.S. PATENT DOCUMENTS

| | | |
|---|---|---|
| 6,777,060 B2 | 8/2004 | Sehmer et al. |
| 7,546,661 B2 | 6/2009 | Connor, Jr. |
| 7,752,718 B2 | 7/2010 | Fisher et al. |
| 7,891,151 B2 | 2/2011 | Sano |
| 7,945,992 B2 | 5/2011 | Parisi et al. |
| 8,375,514 B2 | 2/2013 | Dendo |
| D695,591 S | 12/2013 | Ackerman et al. |
| 2007/0257506 A1 | 11/2007 | Kenny et al. |
| 2009/0269546 A9 | 10/2009 | Alford |
| 2010/0122429 A1 | 5/2010 | Gonzalez et al. |
| 2012/0034409 A1 | 2/2012 | Price et al. |

FOREIGN PATENT DOCUMENTS

| | | |
|---|---|---|
| JP | 4493210 B2 | 6/2010 |
| JP | 2010-195179 A | 9/2010 |

\* cited by examiner

VEHICLE FLOOR MAT

CROSS-REFERENCE TO RELATED APPLICATIONS

This is a divisional application of U.S. patent application Ser. No. 13/544,289, filed on Jul. 9, 2012, which claims the benefit of priority from the prior Japanese Patent Application Nos. 2011-188015, filed on Aug. 30, 2011 and 2011-256891 filed on Nov. 25, 2011, the entire contents of which are incorporated herein by references.

BACKGROUND OF THE INVENTION

1. Field of the Invention

The present invention relates to a vehicle floor mat including at least one fastening device.

Description of Related Art

2. Conventionally, as an invention of such kind, there has been disclosed a mat fastening device (e.g., Japanese Patent No. 4493210) composed of a male grommet and a female grommet that are made of resin. The female grommet includes: an outer cylindrical portion that has open ends and is inserted into a hole provided on a mat; and a flange formed on an outer circumference of one end of the outer cylindrical portion and abutting against a surface of the mat. The male grommet includes: an inner cylindrical portion that has open ends and is inserted into the outer cylindrical portion; and a flange formed on an outer circumference of one end of the inner cylindrical portion and abutting against an other surface of the mat. The outer cylindrical portion and the inner cylindrical portion are provided with engageable sections allowing the male grommet and the female grommet to be connected to each other. In addition, the male grommet and the female grommet are provided with a plurality of pins digging into the mat such that the male grommet is restricted from rotating.

Further, there has been disclosed a fastening device (e.g., Japanese Unexamined Patent Application Publication No. 2010-195179) for fixing a floor mat to a carpet. This fastening device is composed of: a first fastening member attached to a circumferential section of an attachment hole of the carpet; a knob attached to the first fastening member; and a second fastening member having a center through hole and being attached to a circumferential section of an attachment hole of the floor mat. The first fastening member is composed of a first carpet grommet and a second carpet grommet that serve to vertically sandwich therebetween the circumferential section of the attachment hole of the carpet. The first carpet grommet and the second carpet grommet are provided with: a first carpet grommet flange and a second carpet grommet flange that abut against the circumferential section of the attachment hole of the carpet; and engageable sections allowing the first carpet grommet and the second carpet grommet to be connected to each other with the carpet being sandwiched therebetween. Further, the second carpet grommet is provided with a knob base for receiving and connecting to the knob. Particularly, the knob base is a cylindrical body raised from the second carpet grommet flange and having a center space in which a knob receiving hole for receiving the knob is formed. The first carpet grommet is provided with a through hole allowing the knob base to be inserted therethrough. The knob, when inserted into the knob base, can be connected to the corresponding knob base in a manner such that the knob becomes axially rotatable in the knob base. Here, the knob includes: a knob top portion formed so large that it can abut against a circumferential section of the through hole of the second fastening member; and a knob axial portion to be inserted into the knob base. Further, the knob base includes: a base engagement section that is formed outside the cylindrical body and is engageable with an engagement section of the first carpet grommet; and knob connecting engagement claws that is formed inside the cylindrical body and is engageable with an engagement section of the knob axial portion inserted into the knob receiving hole. The knob is allowed to axially rotate in the knob base such that there are enabled: an unlocked position in which the knob top portion is not engaged with the second fastening member; and a locked position in which the knob top portion is engaged with the second fastening member. As mentioned above, the first carpet grommet and the second carpet grommet of the first fastening member serve to vertically sandwich the carpet therebetween. Meanwhile, the second fastening member is attached to the floor mat, and the knob is connected to the knob base. Here, the second fastening member attached to the floor mat is then placed on top of the first carpet grommet of the first fastening member attached to the carpet, such that the knob top portion is inserted through the through hole of the second fastening member. Subsequently, once the knob has been axially rotated from the unlocked position to the locked position, the knob top portion will abut against the engagement section formed on the second fastening member, thereby pressing the second fastening member against the first fastening member in the axial direction, thus allowing the floor mat to be fixed to the carpet. The second fastening member includes a first mat grommet and a second mat grommet that serve to sandwich the floor mat therebetween. Here, an engagement portion for the first mat grommet and the second mat grommet to be connected to each other, includes: a cylindrical portion provided on the first mat grommet; and a cylindrical portion engageable with the first mat grommet by surrounding the aforementioned cylindrical portion. These cylindrical portions are connected to each other through the attachment hole of the floor mat. Further, outer circumferential sections of flanges of the first and second mat grommets, are provided with a plurality of pins digging into the floor mat, thus preventing a positional deviation and an axial rotation of the second fastening member.

Furthermore, there has also been disclosed a hook stopper composed of a first stopper and a second stopper (e.g., Japanese Unexamined Patent Application Publication No. Hei 11-230134). Particularly, a first cylindrical portion of the first stopper is inserted through a through hole provided on a carpet from a surface side of the carpet, so as to allow a second cylindrical portion of the second stopper to be fitted in the first cylindrical portion from a back side of the carpet. Here, a first engagement claw provided on an inner circumferential surface at an other end of the first cylindrical portion, is caused to engage with a second engagement claw provided on an outer circumferential surface at one end of the second cylindrical portion. Further, a hook engagement claw provided on an inner circumferential surface at the one end of the second cylindrical portion, is caused to engage with a fitting protrusion of a hook.

SUMMARY OF THE INVENTION

Although the mat fastening device disclosed in Japanese Patent No. 4493210 includes the protrusions for rotation prevention, there is provided on the floor mat only one attachment hole allowing the upper and lower grommets to be connected to each other through the outer and inner cylindrical portions. Further, although the fastening device disclosed in Japanese Unexamined Patent Application Publication No. 2010-195179 includes the pins for rotation prevention, there is also provided on the floor mat only one attachment hole allowing the first and second mat grommets to be connected to each other through the engagement portion. That is, each fastening device of the aforementioned patent documents allows only one attachment hole to bear the load when an external force has been applied to the floor mat, thus possibly expanding the attachment hole if the mat exhibits a significantly elastic property and causing the grommets to be disengaged therefrom accordingly.

Furthermore, the hook stopper disclosed in Japanese Unexamined Patent Application Publication No. Hei 11-230134, has a problem of easily causing the pile of the carpet to be brought down and then caught between the first cylindrical portion and the second stopper fitted in the first cylindrical portion, when inserting the first cylindrical portion of the first stopper into the through hole provided on the carpet from the surface side of the carpet. Here, even the mat fastening device disclosed in Japanese Patent No. 4493210 easily causes the pile of the carpet to be caught between the female grommet and the male grommet when connecting the female grommet and the male grommet to each other in the mat hole, thus requiring an extra care when attaching the corresponding mat fastening device such that the pile will not be caught between the grommets.

The present invention has been made to solve the aforementioned problems. Particularly, it is an object of the present invention to provide a vehicle floor mat capable of distributing a load applied to where a second fastening member is attached and reducing a load applied to a mat main body.

Further, it is also an object of the present invention to provide a vehicle floor mat capable of reliably connecting cylindrical connection portions of upper and lower half bodies to each other in a through hole of a mat main body.

In order to achieve the aforementioned objectives, the invention as set forth in a first aspect provides a vehicle floor mat having: a mat main body; and at least one fastening device for fastening the mat main body to a vehicle, in which the fastening device comprises: at least one first fastening member fixed to the vehicle, the first fastening member having a vertical retainer provided thereon; and at least one second fastening member fixed to the mat main body, in which the second fastening member comprises: an insertion receiving section for the retainer to be inserted thereinto in a manner capable of being engaged therewith; and an upper half body and a lower half body that serve to sandwich the mat main body, and are connected to each other not only through a half body connecting portion allowing the retainer to be inserted thereinto but also through at least one outer connecting portion provided outside the half body connecting portion.

Further, according to the invention as set forth in a second aspect, the outer connecting portion is provided on both sides of the half body connecting portion.

Furthermore, according to the invention as set forth in a third aspect, the mat main body is disposed rearwardly of a gas pedal and extends in a rear direction, and the second fastening member is provided on a rear section of the mat main body and in the vicinity of a virtual line extending rearwardly of the gas pedal.

Furthermore, according to the invention as set forth in a fourth aspect, the half body connecting portion and the outer connecting portion are disposed in a direction substantially orthogonal to the virtual line extending rearwardly of the gas pedal.

Furthermore, the invention as set forth in a fifth aspect is a vehicle floor mat having: a mat main body; and at least one fastening device for fastening the mat main body to a vehicle, in which the fastening device comprises: at least one first fastening member fixed to the vehicle, the first fastening member having a vertical retainer provided thereon; and at least one second fastening member fixed to the mat main body, in which the second fastening member comprises: an insertion receiving section for the retainer to be inserted thereinto in a manner capable of being held thereby; an upper half body and a lower half body that serve to sandwich the mat main body; first and second cylindrical connection portions that are separately provided on the upper half body and the lower half body, and are connected to each other in a through hole in the mat main body to connect the upper half body and the lower half body to thereby allow the retainer to be inserted into the cylindrical connection portions; and an extending portion provided around an opening edge of the second cylindrical connection portion, the extending portion being bended when engaging the upper and lower half bodies with each other.

Furthermore, according to the invention as set forth in a sixth aspect, the first cylindrical connection portion is capable of being inserted into the second cylindrical connection portion provided with the extending portion, and a bended guiding section is provided on one of the upper and lower half bodies so that the extending portion is bended along the bended guiding section when engaging the upper and lower half bodies with each other.

Furthermore, according to the invention as set forth in a seventh aspect, the extending portion is formed to a height allowing a front end thereof to protrude from a first end surface of the mat main body when the second cylindrical connection portion provided with the extending portion is inserted into the through hole from a second end surface of the mat main body.

According to the vehicle floor mat as set forth in the first aspect of the present invention, the outer connecting portion is provided outside the half body connecting portion formed around the insertion receiving section, thereby improving a connecting strength between the upper half body and the lower half body.

According to the vehicle floor mat as set forth in the second aspect of the present invention, the outer connecting portion is provided outside the half body connecting portion, thereby allowing the upper half body and the lower half body to be further strongly held by the mat main body.

According to the vehicle floor mat as set forth in the third aspect of the present invention, there can be achieved an improved and sufficient holding strength with respect to a load applied toward a front direction of the mat main body by a passenger maneuvering the gas pedal.

According to the vehicle floor mat as set forth in the fourth aspect of the present invention, the half body connecting portion and the outer connecting portion are disposed in the orthogonal direction, thereby making it possible to distribute a load applied to the half body connecting portion with respect to the load applied toward the front direction of the mat main body by the passenger maneuvering the gas pedal, thus preventing the half body connecting portion from being disengaged and allowing the same to be further strongly held by the mat main body.

According to the vehicle floor mat as set forth in the fifth aspect of the present invention, the pile of the mat main body is prevented from being caught when allowing the second fastening member to be held by the mat main body, thereby allowing the fixing members to be attached easily.

According to the vehicle floor mat as set forth in the sixth aspect of the present invention, the extending portion for pile capture prevention is bended along the bended guiding section of the second fastening member, thereby reliably preventing the pile from being caught, and improving an appearance as a result of allowing the extending portion to be fitted in the second fastening member.

According to the vehicle floor mat as set forth in the seventh aspect of the present invention, the extending portion is formed higher than a thickness of the mat main body, thus reliably preventing the pile from being caught.

DETAILED DESCRIPTION OF THE INVENTION

Figure 1:
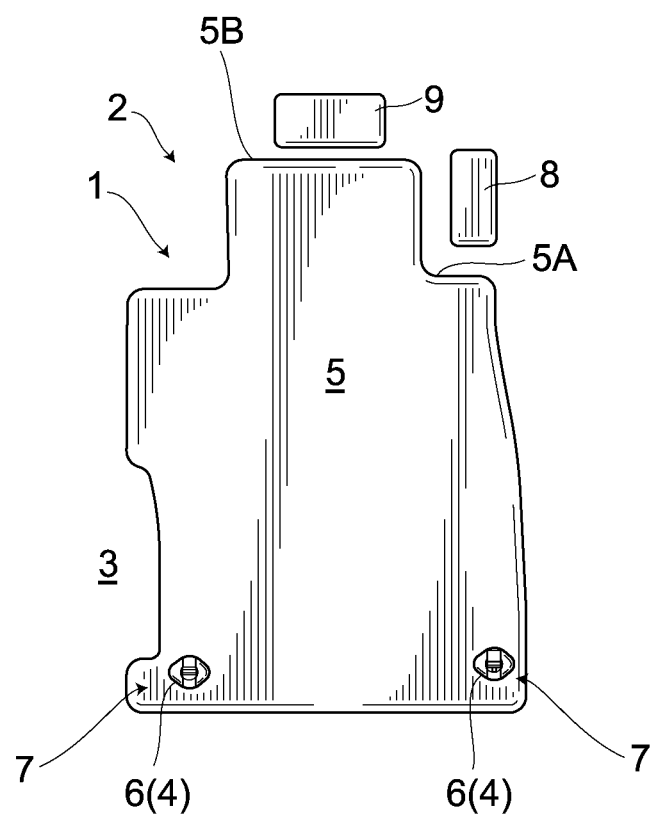
FIG. 1 is an overall plan view showing a first embodiment of the present invention.

Embodiments of a vehicle floor mat of the present invention are described hereunder with reference to the accompanying drawings.

First Embodiment

A first embodiment is shown in FIG. 1 through FIG. 22. As shown in these drawings, a vehicle floor mat 1 includes: at least one first fastening member 4 that is made of synthetic resin and fixed to a vehicle carpet 3 provided on a vehicle floor 2; a mat main body 5 detachably laid on the vehicle carpet 3; and at least one second fastening member 6 that is also made of synthetic resin and fixed to the mat main body 5. The first fastening member 4 and the second fastening member 6 compose a fastening device 7 allowing the mat main body 5 to be fixed to a vehicle. Here, a synthetic resin can, for example, be POM (polyacetal) or the like.

As shown in FIG. 1, the mat main body 5 is, for example, laid on the vehicle floor 2 on a driver's side in the vehicle. A gas pedal 8 extending in a front-rear direction is located on a right side of the vehicle floor 2 on the driver's side, whereas a brake pedal 9 extending in a left-right direction is located on a left side of the gas pedal 8. Further, a recess 5A corresponding to the gas pedal 8 is provided on a front right corner of the mat main body 5. Furthermore, a front end edge 5B of the mat main body 5 is positioned proximally to the brake pedal 9. Particularly, a space is provided between the front end edge 5B of the mat main body 5 and the brake pedal 9 such that the mat main body 5 and the brake pedal 9 do not interfere with each other.

Figure 4:
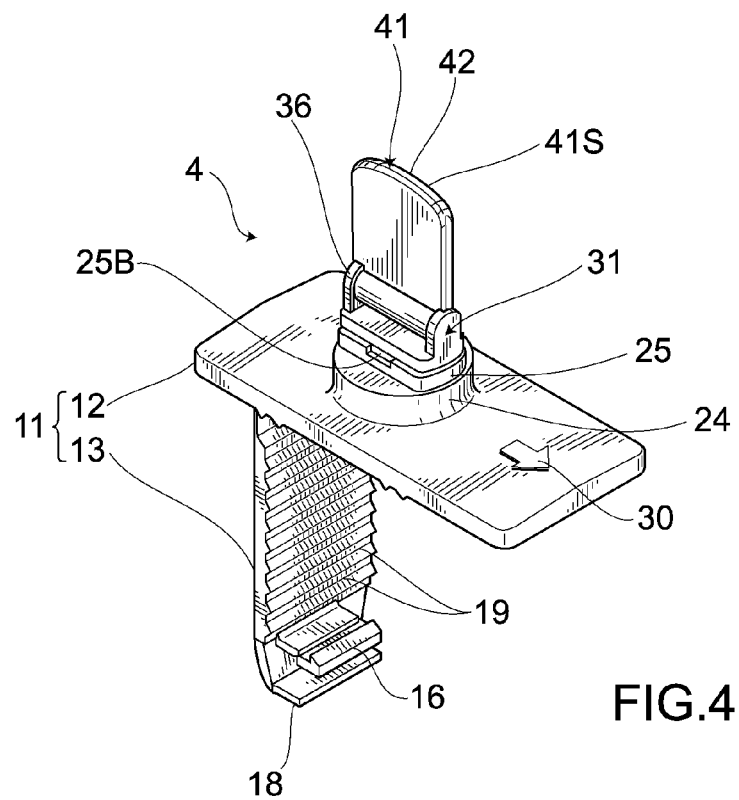
FIG. 4 is a perspective view showing a first fastening member of the first embodiment.
Figure 5:
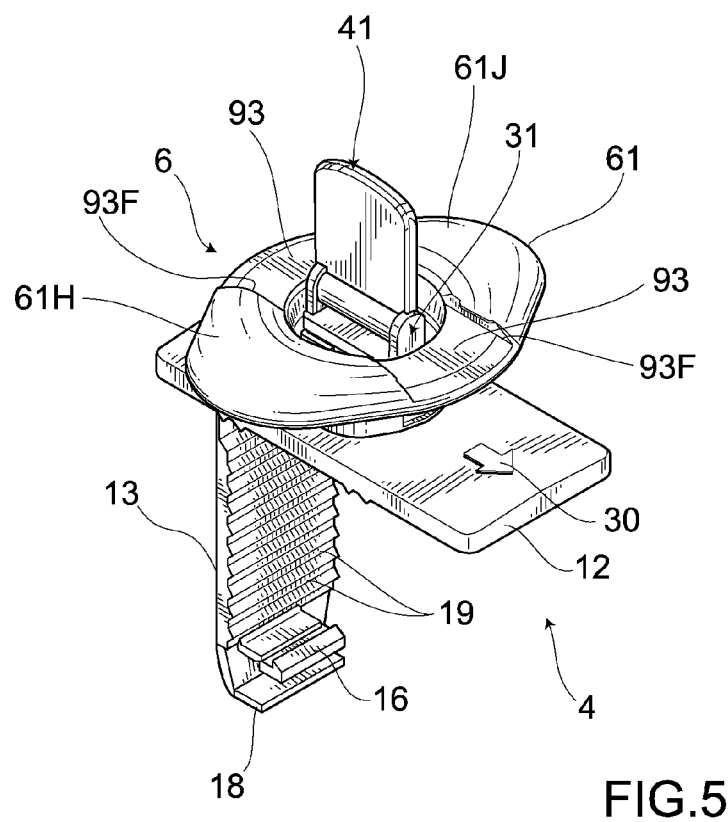
FIG. 5 is a perspective view showing a fastening device of the first embodiment in which a rotating knob has been rotated to an unlocked position.
Figure 6:
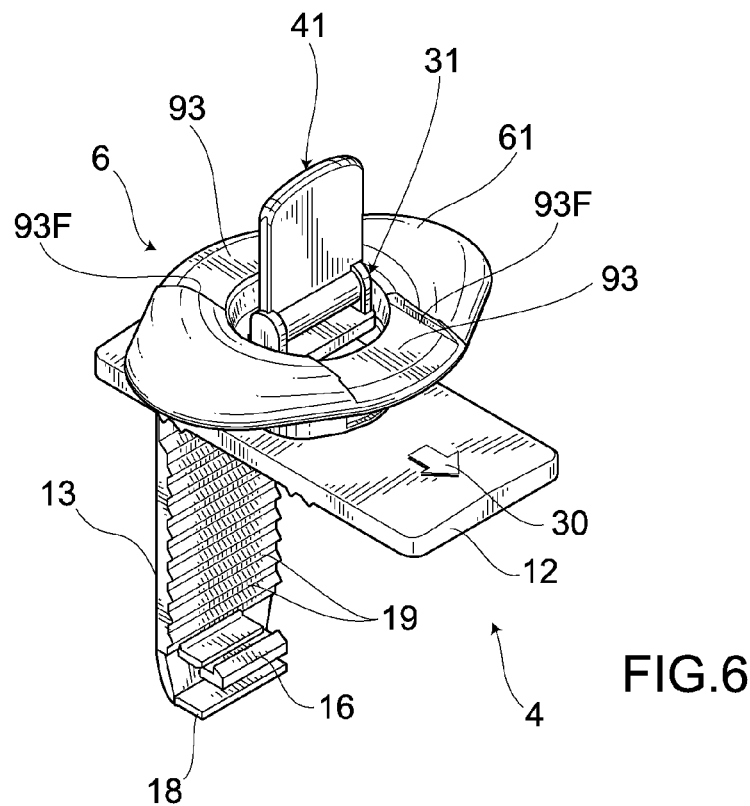
FIG. 6 is a perspective view showing the fastening device of the first embodiment in which the rotating knob has been rotated to a locked position.
Figure 7:
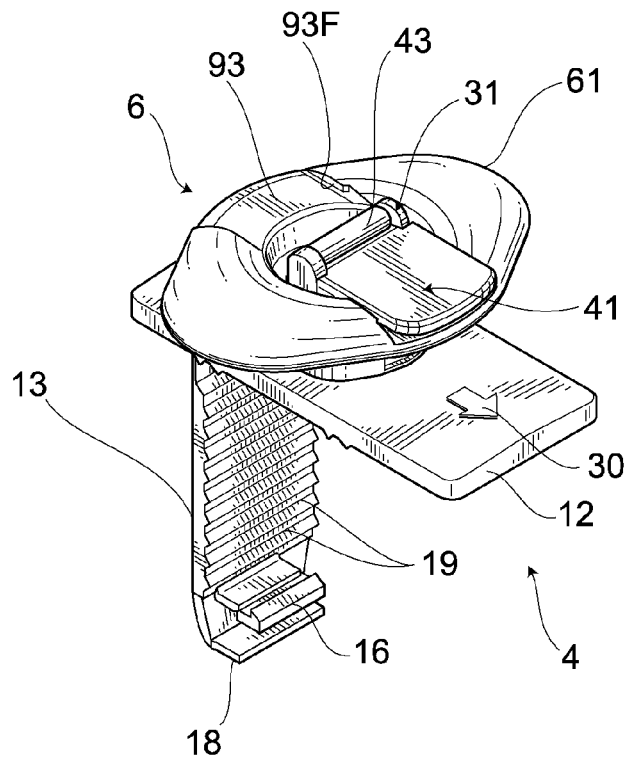
FIG. 7 is a perspective view showing the fastening device of the first embodiment in which a lever of the rotating knob rotated to the locked position has been brought down.

As shown in FIG. 4, for example, the first fastening member 4 includes a carpet fixing portion 11 to be fixed to the vehicle carpet 3. The carpet fixing portion 11 further includes: a plate-shaped upper base portion 12 to be disposed on an upper surface of the vehicle carpet 3; and a lower sandwiching portion 13 that is to be disposed on a lower surface of the vehicle carpet 3 and sandwiches the corresponding vehicle carpet 3 in a manner such that the vehicle carpet 3 is actually held between the lower sandwiching portion 13 and the upper base portion 12. The upper base portion 12 has a substantially rectangular shape when viewed from top. The lower sandwiching portion 13, when viewed from top, also has a substantially rectangular shape extending in the same direction as the upper base portion 12, the lower sandwiching portion 13 being formed smaller than the upper base portion 12. Further, a penetrating portion 14 protrudes from one side of a lower surface of the upper base portion 12 in a longitudinal direction, the penetrating portion 14 having a lower end connected to one end of the lower sandwiching portion 13 in the longitudinal direction. A thin-walled hinge portion 15 is then provided between the penetrating portion 14 and the lower sandwiching portion 13. Furthermore, an elastic claw 16 facing upward protrudes from an other end side of the lower sandwiching portion 13 in the longitudinal direction. A claw receiving portion 17 allowing the elastic claw 16 to be elastically connected thereto, is provided on the lower surface of the upper base portion 12. Furthermore, a raised portion 18 bended upward is provided on an other end of the lower sandwiching portion 13, the raised portion 18 being located beyond the claw receiving portion 17 and allowing the corresponding claw receiving portion 17 to be hidden thereinside in a fixed state. Furthermore, a plurality of concavities and convexities 19 are formed on an upper surface of the lower sandwiching portion 13. Here, the elastic claw 16 and the claw receiving portion 17 compose a connector 20 of the first fastening member 4 that allows the upper base portion 12 and the other end of the lower sandwiching portion 13 to be elastically connected to each other.

Figure 2:
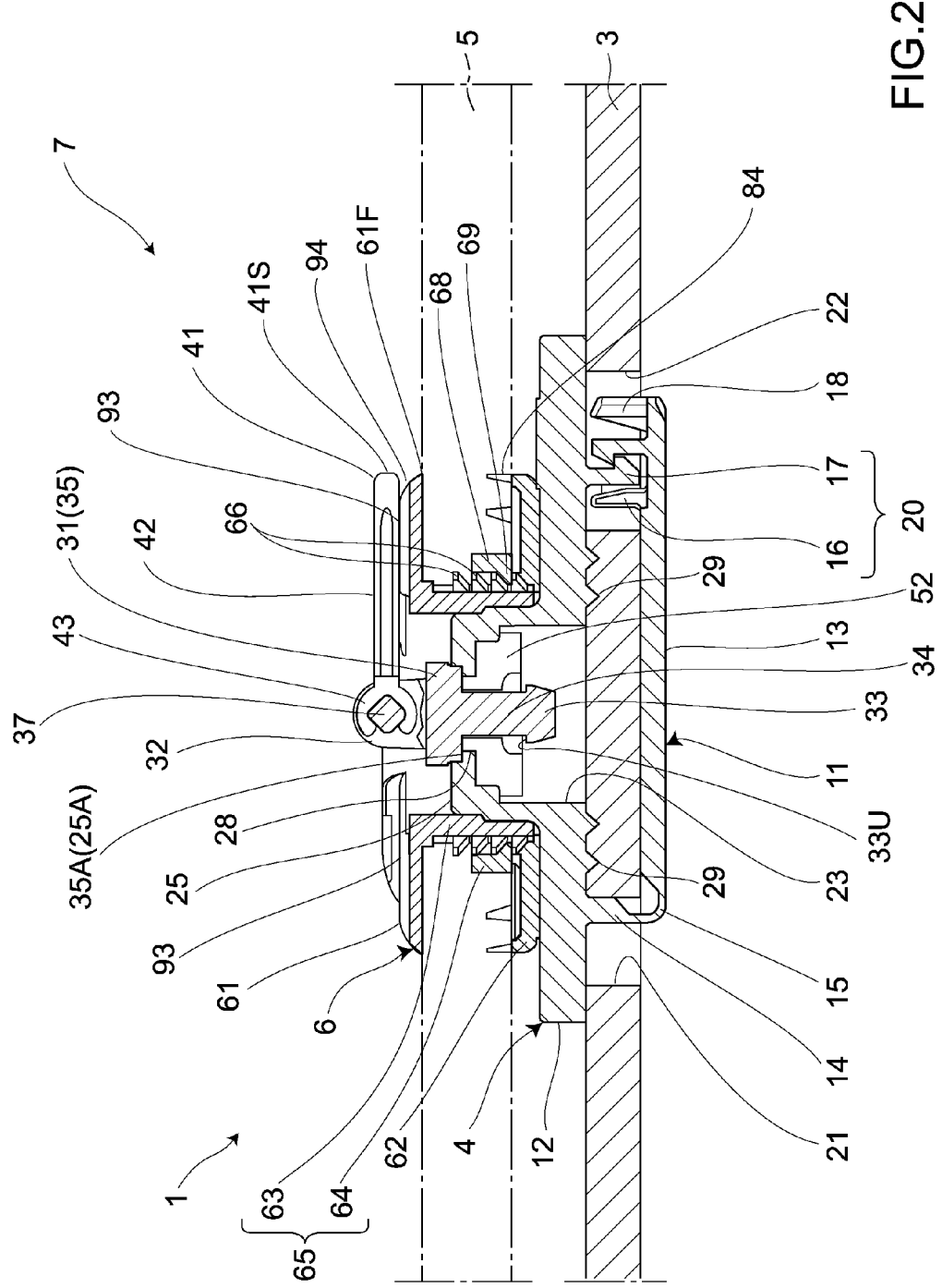
FIG. 2 is a cross-sectional view of the first embodiment that is taken along an advancement direction.

As shown in FIG. 2, for example, the vehicle carpet 3 has a first and a second through holes 21, 22 bored therein, the first and second through holes 21, 22 being provided as a pair and corresponding to a mounting location of the first fastening member 4. Here, the lower sandwiching portion 13 is inserted through the first through hole 21 from above the vehicle carpet 3. At the same time, the claw receiving portion 17 is inserted through the second through hole 22. Particularly, the lower sandwiching portion 13 thus inserted is then bent around the hinge portion 15 and toward the vehicle carpet 3, thereby allowing the elastic claw 16 on the front end to be elastically engaged with the claw receiving portion 17, thus causing the vehicle carpet 3 to be held by the upper base portion 12 and the lower sandwiching portion 13 in a vertical direction and the first fastening member 4 to be fixed to the vehicle carpet 3 eventually. At that time, the elastic claw 16, the claw receiving portion 17 and the raised portion 18 are accommodated in the second through hole 22. Here, since the claw receiving portion 17 is now located between the elastic claw 16 and the raised portion 18, the claw receiving portion 17 does not come into contact with an inner edge of the second through hole 22. Further, even if the elastic claw 16 does come into contact with the inner edge of the second through hole 22, the elastic claw 16 will not be disengaged from the claw receiving portion 17 due to the fact that the elastic claw 16 is being pushed in an engagement direction. Furthermore, since the concavities and convexities 19 abut against the lower surface of the vehicle carpet 3 in the fixed state, there can be prevented a deviation in the location of the first fastening member 4 with respect to the vehicle carpet 3.

A through hole 23 is bored substantially in a center of the upper base portion 12. Further, a cylindrical portion 24 protrudes upward from the through hole 23. The cylindrical portion 24 is provided with a raised center upper surface 25 formed in an upper center section of the corresponding cylindrical portion 24, the center upper surface 25 extending in the longitudinal direction of the first fastening member 4, and having therearound a step portion 26 and a horizontal step level surface 27 that is one step down from the center upper surface 25. The step level surface 27 is formed wider in the longitudinal direction of the center upper surface 25 than in a width direction thereof. Further, an elongated hole 28 extending in the same direction as the center upper surface 25, is bored substantially in a center of the center upper surface 25.

Figure 8:
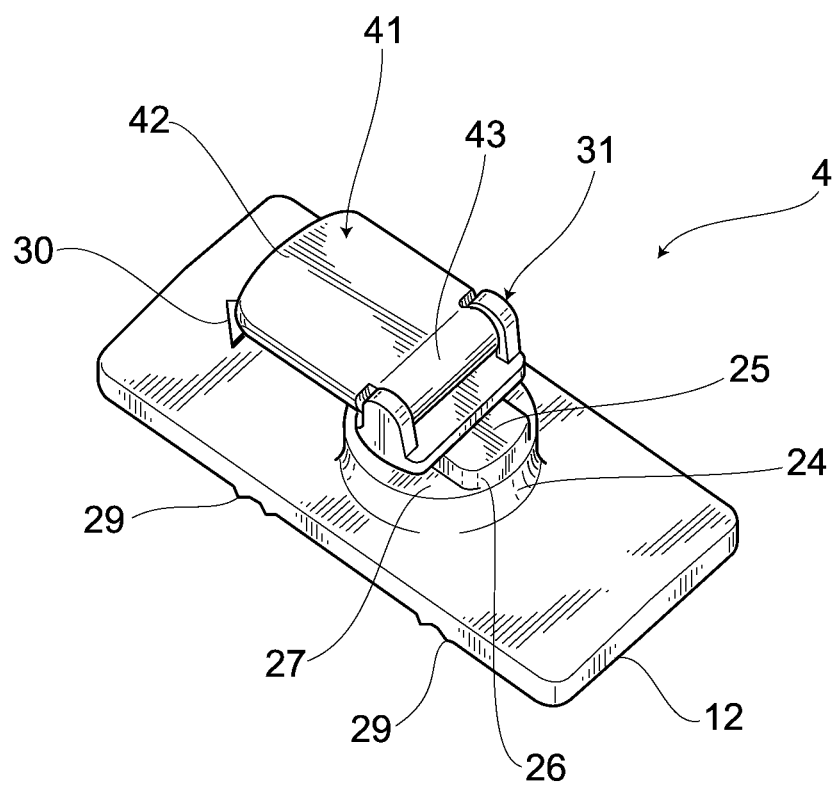
FIG. 8 is a perspective view showing the first fastening member of the first embodiment, in which a lower sandwiching portion is omitted.
Figure 9:
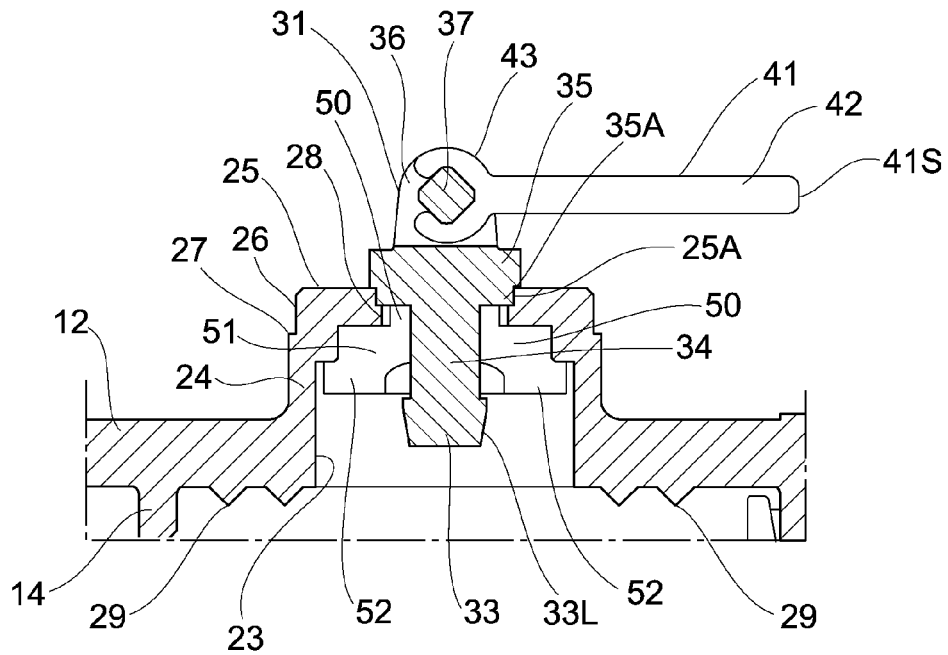
FIG. 9 is a cross-sectional view showing a main section of the first fastening member of the first embodiment.
Figure 10:
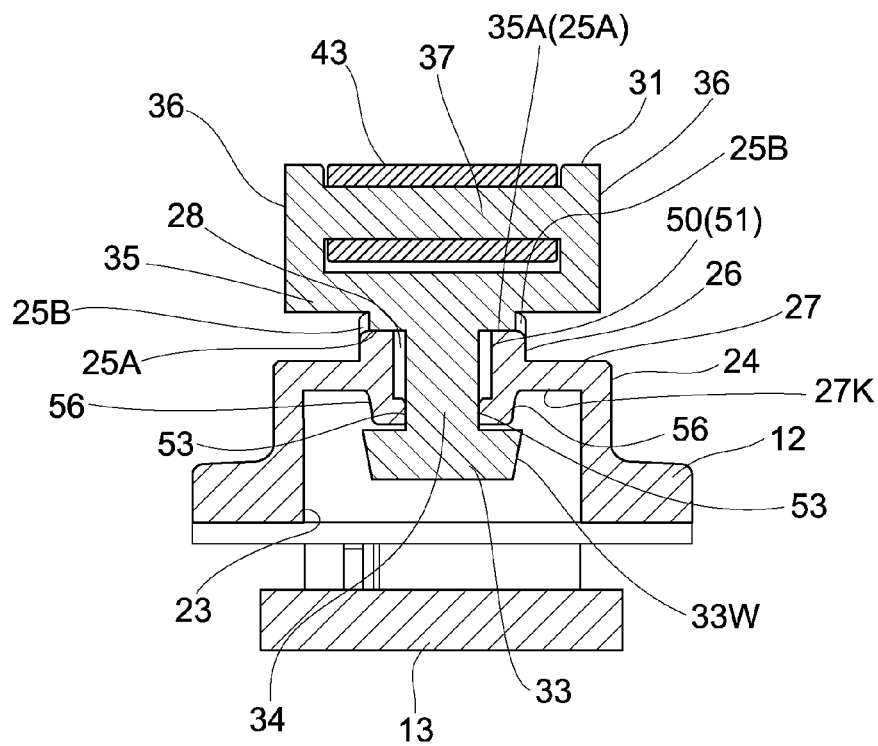
FIG. 10 is a cross-sectional view of the main section of the first fastening member of the first embodiment, that is taken along a direction orthogonal to the direction in FIG. 9.

Further, as shown in FIG. 8, concavo-convex portions 29 are formed on the lower surface of the upper base portion 12 in a manner such that the through hole 23 is positioned therebetween. Furthermore, a symbol 30 indicating a mounting direction of the first fastening member 4 is provided on an upper surface of the upper base portion 12. In the present embodiment, the symbol 30 is formed into a shape of an arrow indicating the mounting direction.

A rotating knob 31 made of synthetic resin is rotatably and axially supported on the upper base portion 12 of the first fastening member 4. The rotating knob 31 thus provided on the first fastening member 4 serves as a retainer that is to be engaged with the aforementioned second fastening member 6.

Figure 11:
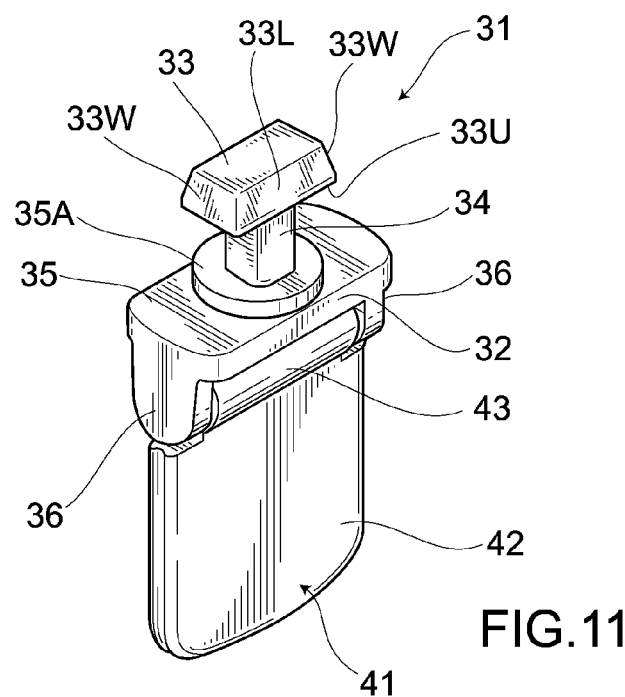
FIG. 11 is a perspective view showing, from a downward direction, the rotating knob of the first embodiment that is equipped with the lever.
Figure 12:
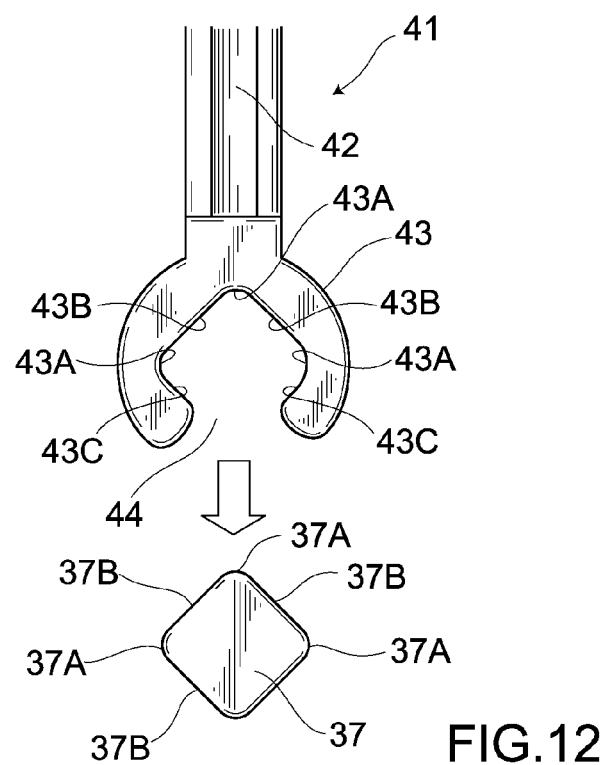
FIG. 12 is an enlarged cross-sectional view showing main sections of the rotating knob and the lever of the first embodiment.

Further, as shown in FIG. 11 which is a bottom perspective view, the rotating knob 31 includes: an operable portion 32 provided on an upper section thereof; and a connection holding portion 33 provided on a lower section thereof and serving as a disengagement prevention connector. The rotating knob 31 further includes an intermediate portion 34 that serves as an axial member and is integrally provided between the operable portion 32 and the connection holding portion 33. The operable portion 32 includes a base portion 35 having a length substantially identical to that of the center upper surface 25. The base portion 35 includes vertical sections 36, 36 protruding from both sides of the corresponding base portion 35 that are in the longitudinal direction. Further, a lever connecting shaft 37 is transversely provided between the vertical sections 36, 36. As shown in FIG. 12, for example, a cross-sectional surface of the lever connecting shaft 37 is a deformed square with four corners thereof chamfered. Particularly, there are formed curved corners 37A and linear sections 37B connecting the adjacent curved corners 37A to one another. A lever 41 is connected to the lever connecting shaft 37. The lever 41 integrally includes: a lever main body 42 made of a plate member having a substantially rectangular shape; and a lever connecting section 43 provided on a base end of the lever main body 42. The lever connecting section 43 has a cross-sectional surface of a substantial "C" shape formed by an opening section 44 on a base end side of the cylindrical body. Further, an inner surface shape of the lever connecting section 43 corresponds to an outer surface shape of the lever connecting shaft 37, and includes: three curved corners 43A; linear sections 43B connecting the adjacent curved corners 43A, 43A to one another; and short linear sections 43C connecting the curved corners 43A to the opening section 44. Furthermore, the curved corners 37A of the lever connecting shaft 37 of the rotating knob 31, are formed on the left, right, top and bottom.

Therefore, when pushing the lever 41 downward with the opening section 44 of the lever connecting section 43 being adjusted to the top curved corner 37A of the lever connecting shaft 37, the lever connecting section 43 will undergo elastic deformation and expand accordingly, thereby allowing the lever connecting shaft 37 to be inserted into the lever connecting section 43 and the curved corners 37A to be engaged with the curved corners 43A, thus allowing the lever 41 to be positioned and fixed vertically and horizontally. In this way, the lever 41 can be foldably mounted with respect to the rotating knob 31.

Further, a circular bearing surface 35A formed around the intermediate portion 34 protrudes from a lower surface of the base portion 35 of the rotating knob 31. Here, a circular concave section 25A corresponding to the circular bearing surface 35A is formed on the center upper surface 25 of the cylindrical portion 24. The circular bearing surface 35A is to be engaged with the circular concave section 25A so as to allow the rotating knob 31 to be rotated. Particularly, an opening section 25B is formed on both sides of the circular concave section 25A in the width direction.

Figure 13:
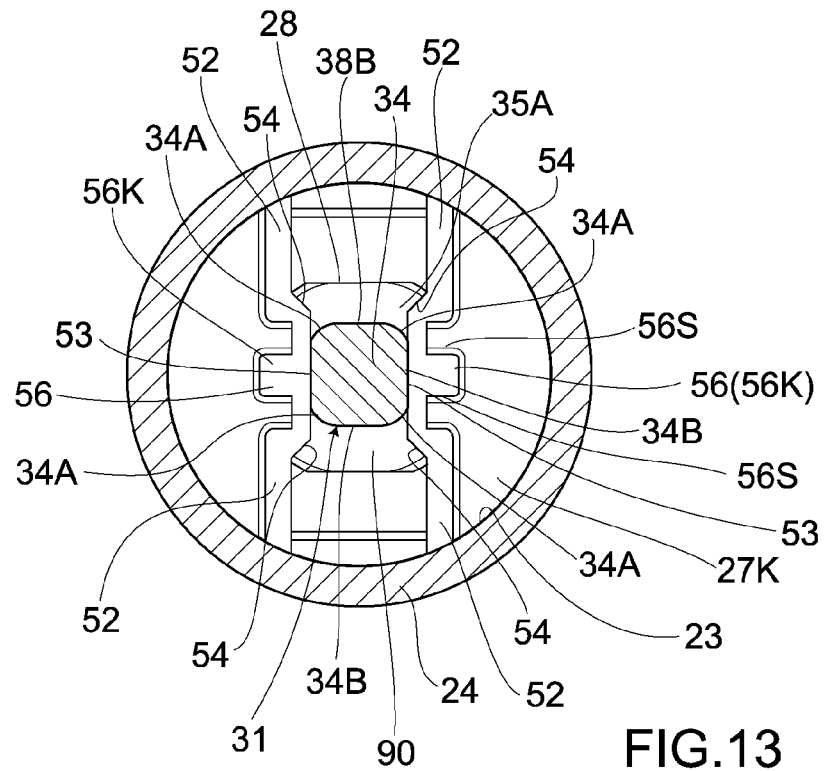
FIG. 13 is a bottom view showing the main section of the first fastening member of the first embodiment, that is taken along a cross-sectional surface of an intermediate portion.
Figure 14:
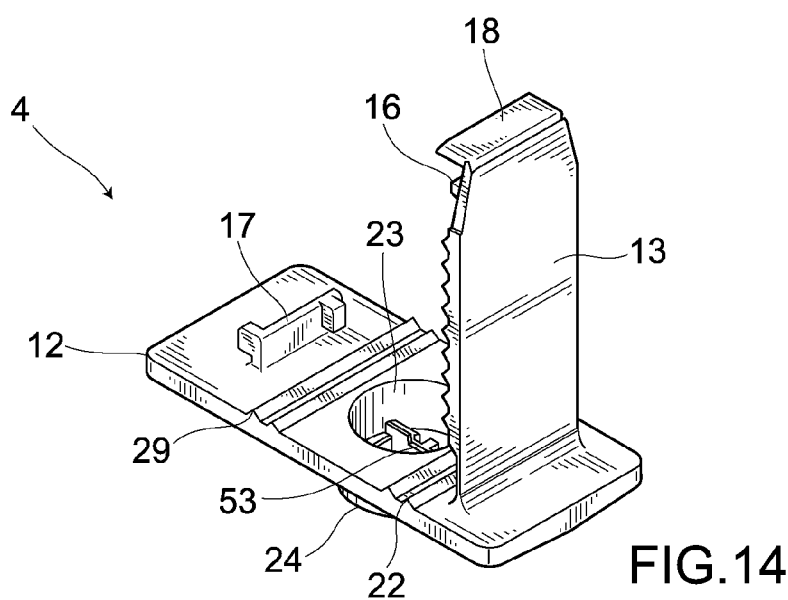
FIG. 14 is a perspective view showing the first fastening member of the first embodiment from a bottom side.
Figure 15:
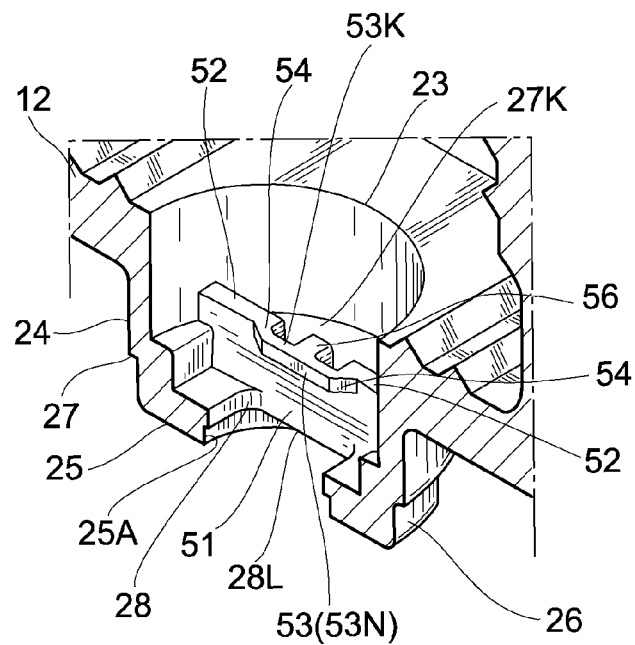
FIG. 15 is a perspective view showing the main section of the first fastening member of the first embodiment from the bottom side.
Figure 16:
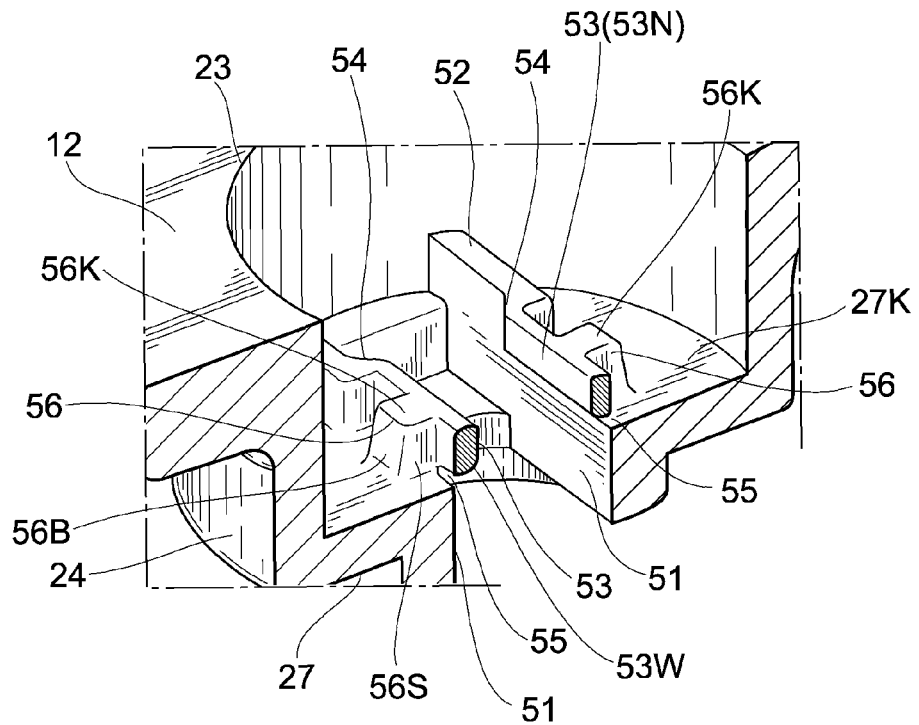
FIG. 16 is a sectional cut-out perspective view showing the first fastening member of the first embodiment from the bottom side.
Figure 17:
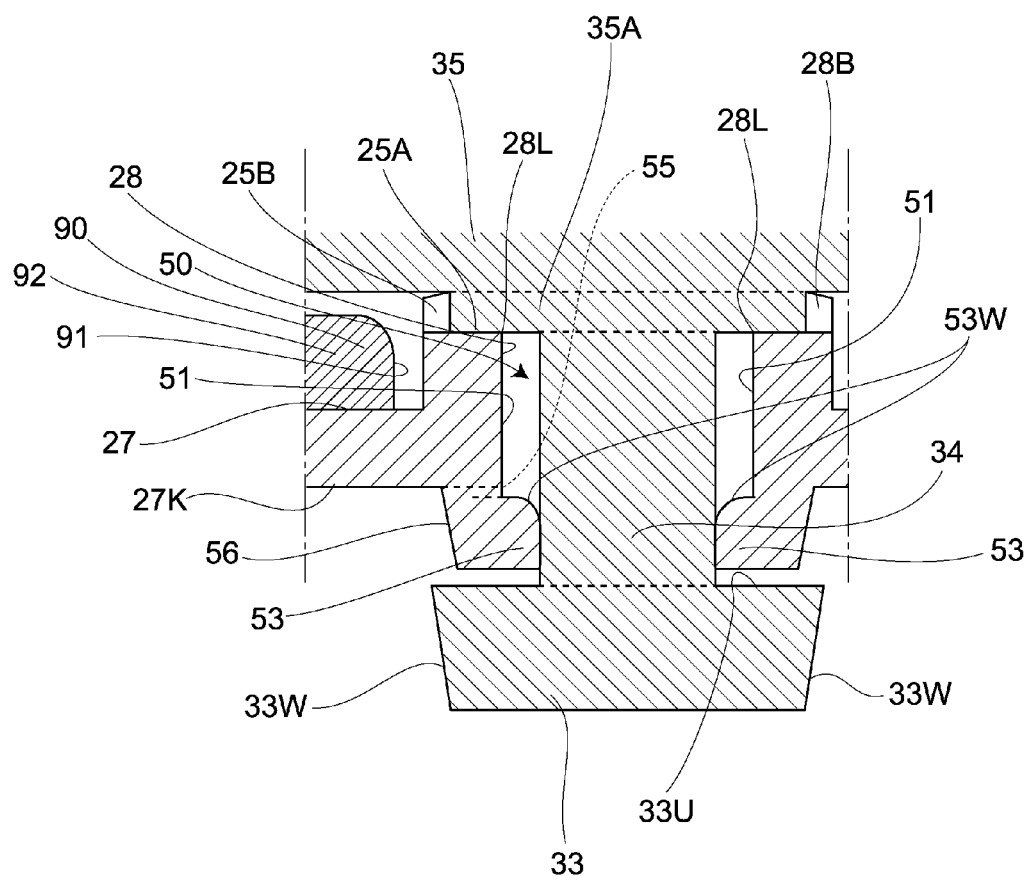
FIG. 17 is an enlarged cross-sectional view showing holding walls and the intermediate portion of the first embodiment.
Figure 18:
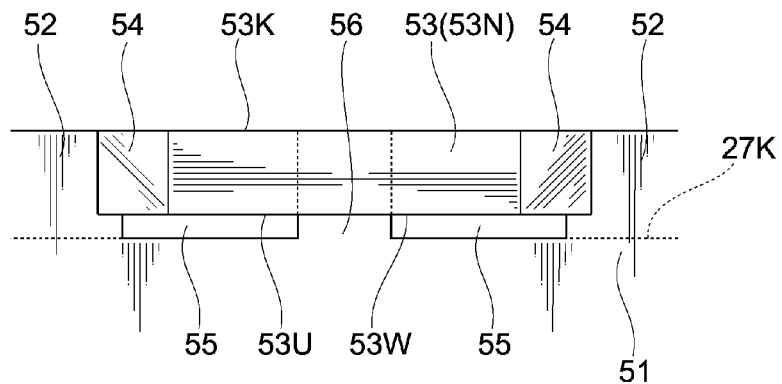
FIG. 18 is a front view of the holding walls of the first embodiment.

As shown in FIG. 13, for example, the intermediate portion 34 has a cross-sectional surface of a noncircular shape as is the case with the lever connecting shaft 37. In the present embodiment, the intermediate portion 34 has a cross-sectional surface of a substantially square shape. Particularly, this cross-sectional surface has: curved corners 34A formed through chamfering; and linear sections 34B formed between the adjacent curved corners 34A, 34A.

The connection holding portion 33 extends in the same direction as the operable portion 32. While the connection holding portion 33 has an upper surface 33U wider than the intermediate portion 34, the connection holding portion 33 itself narrows downward. That is, the connection holding portion 33 has: a pair of side surfaces 33L, 33L extending in the longitudinal direction and inclining toward each other in a downward direction; and a pair of side surfaces 33W, 33W extending in the width direction and also inclining toward each other in the downward direction.

The lower section of the rotating knob 31 is to be inserted into the cylindrical portion 24 through the elongated hole 28. As shown in FIG. 9, FIG. 10, FIG. 15 and FIG. 16, for example, the first fastening member 4 includes a knob receiving section 50 allowing the rotating knob 31 to be engaged therewith in a retained manner, and be rotatably and axially supported thereby. The knob receiving section 50 includes opposed inner surfaces 51, 51 that are formed inside the cylindrical portion 24 and are parallel to each other, the opposed inner surfaces 51, 51 being continuous with long sides 28L, 28L of the elongated hole 28. Further, a lower surface 27K of the step level surface 27 is provided with right and left fixing walls 52, 52 formed on both sides of the elongated hole 28 along the longitudinal direction. Particularly, inner surfaces of the right and left fixing walls 52, 52 are formed in the same plane as the opposed inner surfaces 51, 51. Here, the longitudinal direction of the elongated hole 28 is referred to as a left-right direction when describing a periphery of the cylindrical portion 24.

The knob receiving section 50 includes a type of holding wall 53 that is provided between the right and left fixing walls 52, 52 and allows the intermediate portion 34 of the rotating knob 31 to be engaged therewith, the intermediate portion 34 being held between the holding walls 53, 53 on both sides. Furthermore, as shown in FIG. 13 which is a bottom view, for example, the holding walls 53, 53 protrude inward with inner surfaces 53N, 53N thereof being parallel to each other and to the aforementioned opposed inner surfaces 51, 51. Particularly, right and left sides of each holding wall 53 are connected to the right and left fixing walls 52, 52 through wall connecting sections 54, 54 that are inclined when viewed from top. In addition, an upper edge 53U of each holding wall 53 is separated from the lower surface 27K of the step level surface 27 through a slit 55. A protruding supporting portion 56 serving as a claw portion is integrally provided in a center of an outer surface of each holding wall 53, the supporting portion 56 having an upper section fixed to the lower surface 27K of the step level surface 27. Further, a lower surface 56K of the supporting portion 56 is formed in the same plane as a lower surface 53K of each holding wall 53.

The supporting portion 56 has: right and left side surfaces 56S, 56S that are parallel to each other; a back surface 56B; a plane cross section of a substantially rectangular shape; and a front surface integrally provided on the holding wall 53. Here, as described later, the holding walls 53 will be subjected to a load applied by the intermediate portion 34 as the corresponding intermediate portion 34 rotates.

Therefore, when each holding wall 53 has been subjected to the load applied to the inner surface 53N outward, the holding wall 53 exhibits elastic deformation between the wall connecting sections 54, 54 and the supporting portion 56. As for the section where the supporting portion 56 is formed, the holding wall 53 is elastically deformed only when the supporting portion 56 is elastically deformed as well. That is, the holding wall 53 is more susceptible to elastic deformation in both sides thereof than in the section where the supporting portion 56 is formed. Here, there can be adjusted an elastic deformation amount of each holding wall 53 in the section where the supporting portion 56 is formed, by changing a size of the corresponding supporting portion 56.

As shown in FIG. 13, a distance between the holding walls 53, 53 is substantially identical to a distance H between the linear sections 34B, 34B of the intermediate portion 34, and the width of the upper surface 33U of the connection holding portion 33 is wider than such distance H. Further, the connection holding portion 33 is to be inserted between the holding walls 53, 53. Particularly, a curved corner 53W is formed on an inner corner of the lower surface 53K of each holding wall 53, thus allowing the connection holding portion 33 to be more easily inserted between the holding walls 53, 53.

Here, the connection holding portion 33 of the rotating knob 31 is to be inserted between the holding walls 53, 53 through the elongated hole 28 in the following manner. That is, the connection holding portion 33 is actually pressed into the space between the holding walls 53, 53 along the curved corners 53W. Particularly, the holding walls 53, 53, at that time, will be more distant from each other as a result of elastic deformation, thereby allowing the connection holding portion 33 to pass therebetween and then be engaged with the lower surfaces 53K of the holding walls 53, 53 in a retained manner once the holding walls 53, 53 have been restored, thus also causing the circular bearing surface 35A of the rotating knob 31 to be engaged with the circular concave section 25A formed in an upper section of the elongated hole 28.

Figure 20:
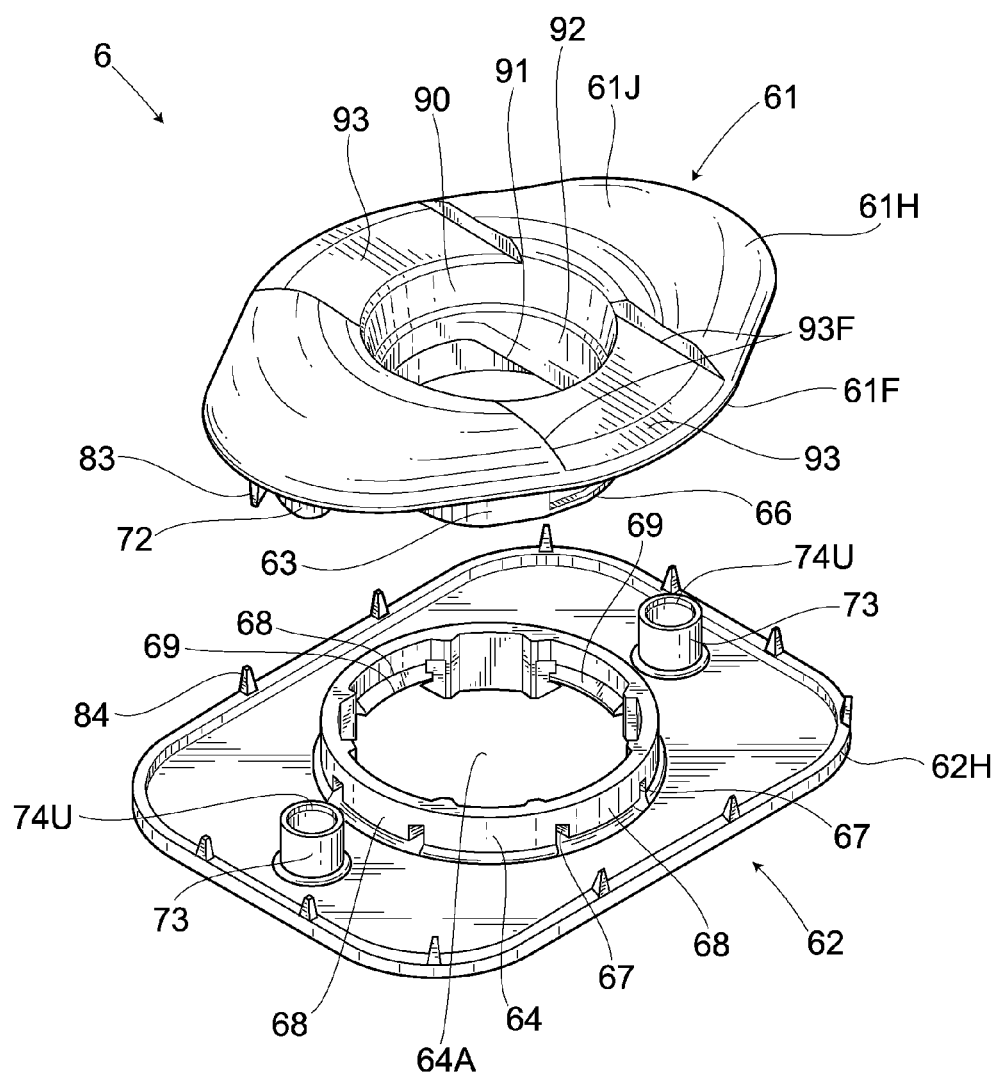
FIG. 20 is an exploded perspective view showing a second fastening member of the first embodiment.

Next, there is described in detail the second fastening member 6 fixed to the vehicle carpet 3. As shown in FIG. 20, for example, the second fastening member 6 includes an upper half body 61 and a lower half body 62 that serve to sandwich the mat main body 5 in a vertical direction. A main body 61H of the upper half body 61 is substantially formed into an oval shape with a center region thereof being higher than a periphery thereof. Further, an upper cylindrical connection portion 63 (also referred to as a first cylindrical connection portion) protrudes downward from a center of the main body 61H. Meanwhile, a main body 62H of the lower half body 62 is substantially formed into a rectangular shape extending in the same direction as the upper half body 61. Here, a lower cylindrical connection portion 64 (also referred to as a second cylindrical connection portion) that is to be connected to the upper cylindrical connection portion 63, protrudes upward from a center of the main body 62H. Particularly, the lower cylindrical connection portion 64 is provided around an opening section 64A of the main body 62H.

Therefore, the upper cylindrical connection portion 63 and the lower cylindrical connection portion 64 are allowed to compose a half body connecting portion 65.

Figure 3:
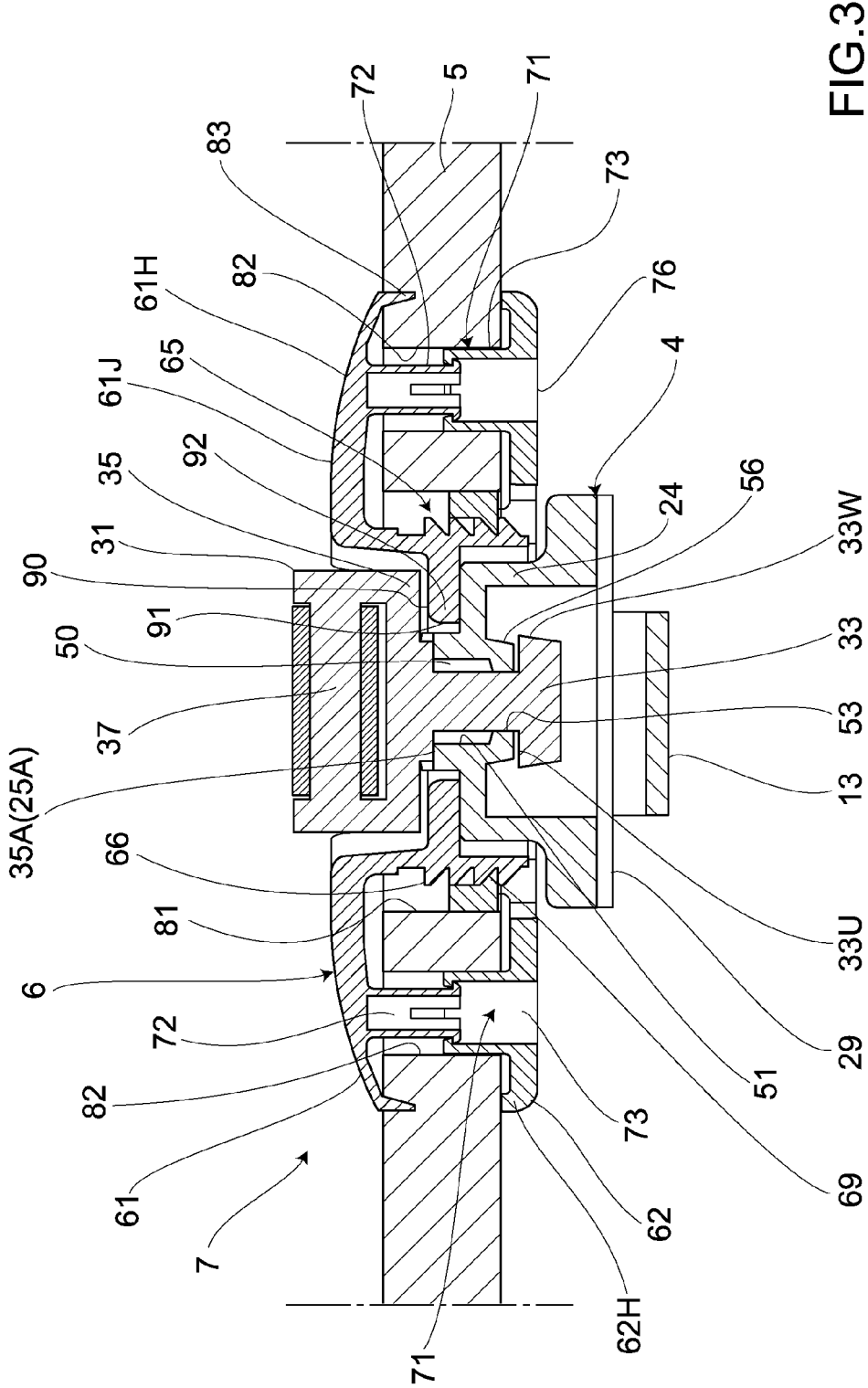
FIG. 3 is a cross-sectional view of the first embodiment that is taken along a direction orthogonal to the advancement direction.

As shown in FIG. 2 and FIG. 3, engagement flange portions 66 are circumferentially provided on an outer circumference of the upper cylindrical connection portion 63, in a multi-row fashion. Particularly, the engagement flange portions 66 have lower surfaces slanting upward from the inside to the outside, and upper surfaces that are substantially horizontal. Further, the lower cylindrical connection portion 64 includes a plurality of cutouts 67, 67 provided at intervals in a circumferential direction and having opened lower ends. Provided between such cutouts 67, 67 are engagement receiving portions 68 with lower ends serving as free ends. Each one of the engagement receiving portions 68 includes an engagement claw section 69 provided on a lower end inner surface thereof and allowing each engagement flange portion 66 to be engaged therewith, the engagement claw section 69 having: an upper surface slanting upward from the inside to the outside; and a lower surface that is substantially horizontal. In the present embodiment, four engagement receiving portions 68 are provided at regular intervals in the circumferential direction. Here, the engagement flange portions 66 can be provided either on the whole circumference of the upper cylindrical connection portion 63, or only in the locations corresponding to the engagement claw sections 69.

Therefore, the engagement flange portions 66 and the engagement claw sections 69 are allowed to compose a connector connecting the upper cylindrical connection portion 63 and the lower cylindrical connection portion 64.

Accordingly, as the upper cylindrical connection portion 63 is being inserted into the lower cylindrical connection portion 64, the engagement receiving portions 68 will move outward as a result of elastic deformation, thereby allowing the engagement flange portions 66 in the given locations to be engaged with the engagement claw sections 69 in a retained manner, thus causing the upper and lower cylindrical connection portions 63, 64 to be connected to each other.

Further, outer connecting portions 71, 71 are symmetrically provided across the aforementioned half body connecting portion 65. Each one of the outer connecting portions 71 includes: an outer upper cylindrical connection portion 72 protruding downward from a lower surface of the upper half body 61; and an outer lower cylindrical connection portion 73 protruding upward from an upper surface of the lower half body 62. An engagement outer flange portion 74S is circumferentially provided on a lower end of the outer upper cylindrical connection portion 72. Also provided on the lower end of the outer upper cylindrical connection portion 72, are a plurality of vertical slits 75. Meanwhile, an engagement inner flange portion 74U is circumferentially provided on an upper end of the outer lower cylindrical connection portion 73. Particularly, as the engagement outer flange portion 74S is being inserted into the engagement inner flange portion 74U, the engagement outer flange portion 74S will undergo elastic deformation so as to cause the slits 75 to narrow, thereby allowing the engagement outer flange portion 74S to be inserted into and connected to the engagement inner flange portion 74U in a retained manner. Further, an opening section 76 is provided in a lower section of the outer lower cylindrical connection portion 73. Furthermore, a connecting member 77 is to be inserted into the outer upper cylindrical connection portion 72 through the opening section 76, thereby preventing the lower end of the outer upper cylindrical connection portion 72 from shrinking, thus retaining the connected state between the engagement outer flange portion 74S and the engagement inner flange portion 74U. Here, when employing a screwable member such as a screw or the like as the connecting member 77, the screwable member can be screwed together with the outer upper cylindrical connection portion 72. Further, when employing a pin as the connecting member 77, the pin can be pressed into the outer upper cylindrical connection portion 72. Accordingly, the connecting member 77 serves to retain the connected state between the engagement outer flange portion 74S and the engagement inner flange portion 74U such that they will not be disconnected from each other.

Therefore, the engagement inner flange portion 74U and the engagement outer flange portion 74S are allowed to compose a connector connecting the outer upper cylindrical connection portion 72 and the outer lower cylindrical connection portion 73. Further, a front end surface of the engagement inner flange portion 74U is provided with a slanted guiding section 74T declining from the outside to the inside, whereas a front end surface of the engagement outer flange portion 74S is provided with a slanted guiding section 74T slanting upward from the inside to the outside. These slanted guiding sections 74T, 74T allow the engagement outer flange portion 74S to be smoothly inserted into the engagement inner flange portion 74U.

In the aforementioned mat main body 5, there are bored: a center through hole 81 allowing the half body connecting portion 65 to be inserted therethrough; and outer through holes 82 allowing the outer connecting portions 71 to be inserted therethrough. That is, the connected state of the half body connecting portion 65 is retained inside the center through hole 81, and the connected states of the outer connecting portions 71 are retained inside the outer through holes 82, thus allowing the second fastening member 6 to be fixed to the mat main body 5 with the corresponding mat main body 5 being sandwiched by the upper and lower half bodies 61, 62. Further, as shown in FIG. 3, for example, a plurality of pins 83 are provided on a periphery of a lower surface of the main body 61H of the upper half body 61, the pins 83 being inserted into and engaged with the mat main body 5. Furthermore, as shown in FIG. 2, for example, a plurality of pins 84 are provided on a periphery of an upper surface of the main body 62H of the lower half body 62, the pins 84 also being inserted into and engaged with the mat main body 5. These pins 83, 84 allow the second fastening member 6 to be fixed to the mat main body 5 in a whirl-stop fashion.

Further, there is provided in the upper cylindrical connection portion 63 an insertion receiving section 90 allowing the aforementioned rotating knob 31 to be engaged therewith, the rotating knob 31 serving as the retainer. The insertion receiving section 90 includes: an elongated receiving hole 91 provided in the upper cylindrical connection portion 63 and being smaller than the corresponding upper cylindrical connection portion 63; and an engagement receiving section 92 that is formed into a shape of a partition plate and provided on both sides of the elongated receiving hole 91 in the width direction. Here, the elongated receiving hole 91 is formed so large that it allows the aforementioned operable portion 32 of the rotating knob 31 to be inserted therethrough. Particularly, the center upper surface 25 of the cylindrical portion 24 is to be engageably inserted into the elongated receiving hole 91. With the center upper surface 25 being inserted into the elongated receiving hole 91 in this manner, a lower surface of the engagement receiving section 92 on both sides of the elongated receiving hole 91 in the width direction can now abut against the step level surface 27, thereby allowing the second fastening member 6 to be positioned to the first fastening member 4 and the operable portion 32 in a locked position to be engaged with an upper surface of each engagement receiving section 92.

Next, there are described how the second fastening member 6 is fixed to and unfixed from the first fastening member 4, using the rotating knob 31. In the beginning, as shown in FIG. 4, an unlocked position of the rotating knob 31 refers to a position in which the longitudinal direction of the rotating knob 31 has been adjusted to that of the elongated hole 28, i.e., the center upper surface 25 after rotating the corresponding rotating knob 31. Particularly, the rotating knob 31 is at first rotated to the unlocked position through the operable portion 32 and the raised lever 41, followed by mounting the second fastening member 6 on the first fastening member 4 such that the lever 41 and the operable portion 32 are inserted through the elongated receiving hole 91, thus allowing the center upper surface 25 of the cylindrical portion 24 to be engageably inserted into the elongated receiving hole 91. Next, once the rotating knob 31 has been rotated to the locked position by 90 degrees, the base portion 35 of the rotating knob 31 will be engaged with upper sections of the engagement receiving sections 92 of the second fastening member 6, thus forming a locked state in which the second fastening member 6 is fixed to the first fastening member 4.

Here, as shown in FIG. 13, for example, the linear sections 34B, 34B of the intermediate portion 34 are held by the holding walls 53, 53 in both the locked position and the unlocked position. When rotating the rotating knob 31 under such condition, the rotating knob 31 will actually rotate with the intermediate portion 34 being in contact with the surfaces of the holding walls 53, thereby causing the holding walls 53 to undergo elastic deformation and a rotary torque to be applied to the intermediate portion 34 from the supporting portion 56, thus achieving a favorable click feeling that is available for a long period of time. Further, since the supporting portion 56 is integrally provided on each holding wall 53, the supporting portion 56 allows an operating load of the rotating knob 31 to be increased, and the corresponding operating load can then be set based on the size or the like of the supporting portion 56.

Furthermore, provided on an upper surface of the main body 61H of the upper half body 61, are engagement concave sections 93, 93 serving as engagement sections allowing the lever 41 in the locked position of the rotating knob 31 to be engaged therewith. The engagement concave sections 93 are separately provided on both sides of the second fastening member 6 in the width direction, and are specifically provided on an upper surface 61J of the main body 61H of the upper half body 61, the engagement concave sections 93 being connected to the insertion receiving section 90. Further, the lever 41 is formed so long that it fits within an edge 61F of the main body 61H of the upper half body 61 of the second fastening member 6, when brought down on one of the engagement concave sections 93, 93. In the present embodiment, a front end 41S of the lever 41 brought down is positioned in a location substantially identical to that of the edge 61F, and does not protrude therefrom. Further, each engagement concave section 93 is formed so wide that the lever 41 can fit therein. Particularly, as for the lever 41 that has been brought down, both sides of the lever 41 in the width direction can be engaged with end edges 93F, 93F of the engagement concave section 93, thus preventing the rotating knob 31 from rotating. That is, the rotating knob 31 can be rotated only when the lever 41 is raised, thereby improving a locking reliability regardless of shoe material and shape. Further, as shown in FIG. 2 in which the lever 41 is engaged with the engagement concave section 93, a gap 94 is formed between a lower surface of the front end 41S and the engagement concave section 93, the gap 94 being utilized to raise the lever 41.

That is, the rotating knob 31 is to be rotated to the locked position, followed by bringing down the lever 41 at the corresponding locked position, thereby fixing the mat main body in two steps, thus reliably retaining a fixed state thereof. Further, a strong fixation is possible due to the fact that the lever 41, when brought down, can be received and held by the engagement concave section 93. Furthermore, the lever 41 can fit in the engagement concave section 93, thereby making it possible to regulate the rotation of the rotating knob 31, and evoking no troublesome feeling when fixing the mat main body 5 due to the fact that there are now less protrusions. In fact, the lever 41 can be brought down either forward or backward to enable fixation, thus allowing the second fastening member 6 to be mounted easily. Particularly, a structure allowing the lever 41 to be brought down forward makes operations at the time of mounting/dismounting easier, whereas a structure allowing the lever 41 to be brought down backward makes locations of passengers' feet less influential when fixing the mat main body 5.

Figure 22:
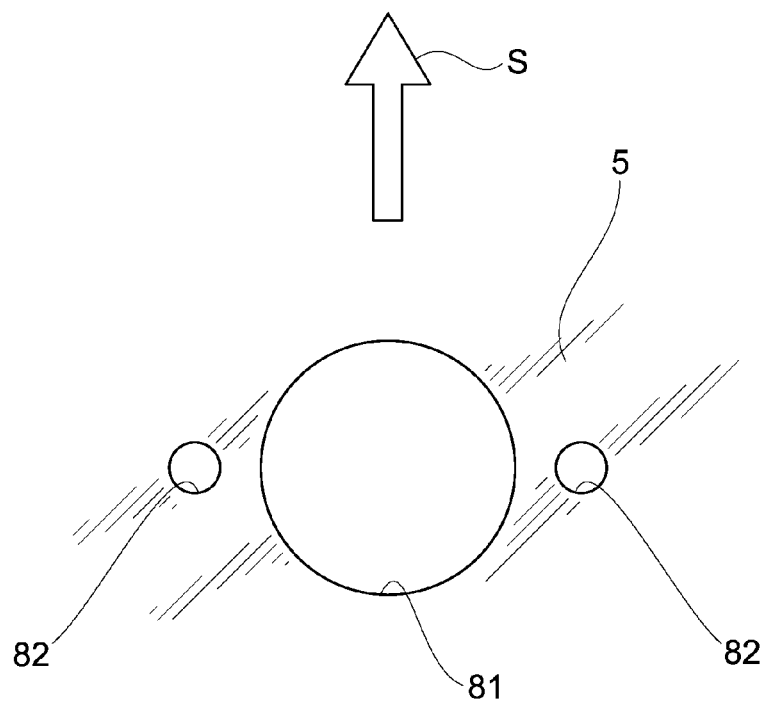
FIG. 22 is a plan view showing a main section of a mat main body of the first embodiment where a center through hole and outer through holes are provided.

The first fastening member 4 and the second fastening member 6 are fixed to the vehicle carpet 3 and the mat main body 5 as follows. That is, as shown in FIG. 1, the mat main body 5 extends rearward from the gas pedal 8 as well as the brake pedal 9. The second fastening member 6 is so fixed to the mat main body 5 that it can be provided on a rear section of the corresponding mat main body 5 and in the vicinity of a virtual line extending rearwardly of the gas pedal 8. Further, as for the fastening device 7 on the right side in FIG. 1, the half body connecting portion 65 and the outer connecting portions 71, 71 are arranged in a direction substantially orthogonal to the virtual line extending rearwardly of the gas pedal 8. This type of arrangement allows the engagement concave sections 93, 93 to be disposed in the front-rear direction substantially parallel to the virtual line extending rearwardly of the gas pedal 8, and the lever 41 to be brought down also in the front-rear direction substantially parallel to an advancement direction S of an advancing vehicle. Further, as shown in FIG. 22, the center through hole 81 and the outer through holes 82, 82 are so formed on the mat main body 5 that they are provided in a direction substantially orthogonal to the advancement direction S. Furthermore, as shown in FIG. 1, the fastening device 7 is also disposed on a rear left side of the mat main body 5.

Accordingly, the outer connecting portions 71 provided outside the half body connecting portion 65, allow the upper half body 61 and the lower half body 62 to be further strongly held by the mat main body 5. Further, the second fastening member 6 can be provided on the rear section of the mat main body 5 and in the vicinity of the virtual line extending rearwardly of the gas pedal 8, thereby achieving an improved and sufficient holding strength with respect to a load applied toward a front direction of the mat main body 5 by the passenger maneuvering the gas pedal. Furthermore, the half body connecting portion 65 and the outer connecting portions 71 are disposed in a direction orthogonal to the advancement direction S, thereby distributing a load applied to the half body connecting portion 65, thus preventing the half body connecting portion 65 from being disengaged and allowing the same to be further strongly held by the mat main body 5.

According to the present embodiment and as set forth in claim 1, the vehicle floor mat includes: the mat main body 5; and at least one fastening device 7 for fixing the mat main body 5 to the vehicle. The fastening device 7 includes: the first fastening member 4 fixed to the vehicle; and the second fastening member 6 fixed to the mat main body 5. The first fastening member 4 includes the rotating knob 31 serving as the vertical retainer, whereas the second fastening member 6 includes the insertion receiving section 90 allowing the rotating knob 31 to be inserted thereinto and engaged therewith. The second fastening member 6 further includes the upper half body 61 and the lower half body 62 that serve to sandwich the mat main body 5. The upper half body 61 and the lower half body 62 are connected to each other through: the half body connecting portion 65 allowing the rotating knob 31 to be inserted thereinto; and the outer connecting portions 71 provided outside the half body connecting portion 65 that is formed around the insertion receiving section 90, thereby improving a connecting strength between the upper half body 61 and the lower half body 62.

Further, according to the present embodiment and as set forth in claim 2, the outer connecting portions 71 are provided on both sides of the half body connecting portion 65, thus allowing the upper half body 61 and the lower half body 62 to be further strongly held by the mat main body 5.

Furthermore, according to the present embodiment and as set forth in claim 3, the mat main body 5 is disposed rearwardly of the gas pedal 8 and extends in the rear direction. The second fastening member 6 can be provided on the rear section of the mat main body 5 and in the vicinity of the virtual line extending rearwardly of the gas pedal 8. Accordingly, there can be achieved an improved and sufficient holding strength with respect to the load applied toward the front direction of the mat main body 5 by the passenger maneuvering the gas pedal.

Furthermore, according to the present embodiment and as set forth in claim 4, the half body connecting portion 65 and the outer connecting portions 71 are disposed in the direction substantially orthogonal to the virtual line extending rearwardly of the gas pedal 8, thereby distributing the load applied to the half body connecting portion 65 with respect to the load applied toward the front direction of the mat main body 5 by the passenger maneuvering the gas pedal 8, thus preventing the half body connecting portion 65 from being disengaged and allowing the same to be further strongly held by the mat main body 5.

Figure 21:
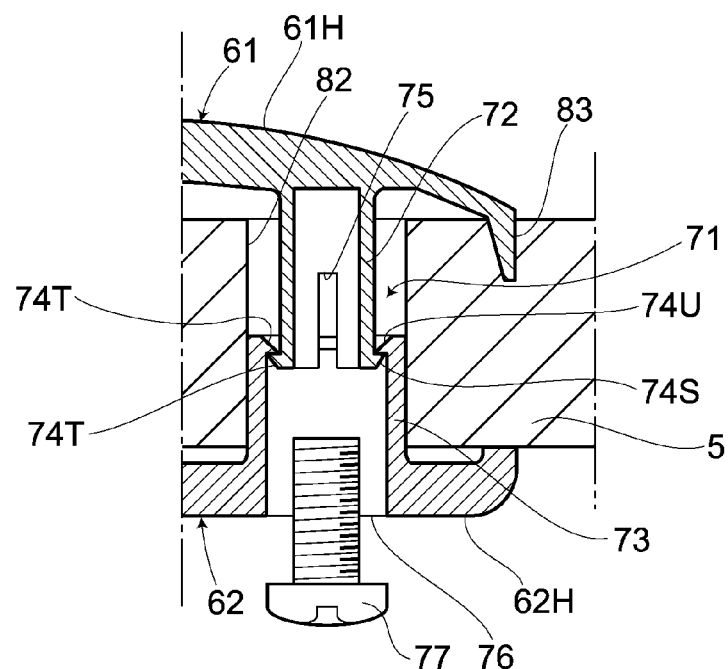
FIG. 21 is an enlarged cross-sectional view showing an outer connecting portion of the second fastening member of the first embodiment.

Effects of the present embodiment are as follows. That is, in the mat main body 5, there are bored: the center through hole 81 allowing the half body connecting portion 65 to be inserted therethrough; and the outer through holes 82 allowing the outer connecting portions 71 to be inserted therethrough. The center through hole 81 and the outer through holes 82 serve to regulate an orientation of the second fastening member 6, thereby allowing a mounting orientation thereof to be determined easily, thus improving a mounting workability when mounting the second fastening member 6 on the mat main body 5. Further, as shown in FIG. 2, FIG. 3 and FIG. 21, an outer diameter of the lower cylindrical connection portion 64 of the half body connecting portion 65 is substantially identical to a diameter of the center through hole 81, and outer diameters of the outer lower cylindrical connection portions 73 of the outer connecting portions 71 are substantially identical to diameters of the outer through holes 82.

That is, the half body connecting portion 65 has a section whose diameter is substantially identical to that of the center through hole 81, and the outer connecting portions 71 have sections whose outer diameters are substantially identical to the diameters of the outer through holes 82. Therefore, the second fastening member 6 can be precisely positioned to the mat main body 5, and there can be achieved a structure hardly exhibiting positional deviations in a mounting state. Further, since the half body connecting portion 65 and the outer connecting portions 71 are composed of cylindrical portions, there can be achieved a favorable connecting strength. Furthermore, since such cylindrical portions have circular outer diameters, the center through hole 81 and the outer through holes 82 can simply be bored into circular shapes, thereby making it easy to process the mat main body 5. Furthermore, each outer connecting portion 71 includes: the outer upper cylindrical connection portion 72 protruding downward from the lower surface of the upper half body 61; and the outer lower cylindrical connection portion 73 protruding upward from the upper surface of the lower half body 62. Particularly, the engagement outer flange portion 74S is circumferentially provided on the lower end of the outer upper cylindrical connection portion 72. Also provided on the lower end of the outer upper cylindrical connection portion 72, are the plurality of vertical slits 75. Meanwhile, the engagement inner flange portion 74U is circumferentially provided on the upper end of the outer lower cylindrical connection portion 73. For these reasons, the outer upper cylindrical connection portion 72 and the outer lower cylindrical connection portion 73 can be easily connected to each other.

Other effects of the present embodiment are as follows. That is, the vehicle floor mat 1 includes: the mat main body 5; and at least one fastening device 7 for fixing the mat main body 5 to the vehicle. Each fastening device 7 includes: the first fastening member 4 fixed to the vehicle; and the second fastening member 6 fixed to the mat main body 5. The first fastening member 4 includes the rotating knob 31 rotating around a vertical axis, whereas the second fastening member 6 includes the insertion receiving section 90 allowing the rotating knob 31 to be inserted thereinto. Particularly, when rotated, the rotating knob 31 thus inserted into the insertion receiving section 90 can then be engaged with the corresponding insertion receiving section 90. Here, the rotating knob 31 includes: the operable portion 32 provided on the upper section thereof; and the connection holding portion 33 that is provided on the lower section thereof and is to be connected to the first fastening member 4. Particularly, the intermediate portion 34 having the noncircular cross-sectional surface, is provided between the operable portion 32 and the connection holding portion 33, the intermediate portion 34 being rotatably and axially supported by the first fastening member 4 and held by the elastic holding walls 53 of the first fastening member 4. Here, since the intermediate portion 34 of the rotating knob 31 is held by the elastic holding walls 53, the rotating knob 31 can be rotated smoothly, thus achieving an improved operational feeling. Further, since the holding walls 53 holding the intermediate portion 34 are formed into the shapes of walls, durabilities of the holding walls 53 can be improved, thus making the operational feeling available for a long period of time. Furthermore, since the intermediate portion 34 is received by wider surfaces of the holding walls 53, an occurrence of looseness can be restricted. Furthermore, since the supporting portions 56 are formed behind the holding walls 53 holding the intermediate portion 34 of the rotating knob 31, there can be adjusted a force used to operate the rotating knob 31, thereby improving a degree of freedom of setting the operational feeling. Here, the intermediate portion 34 includes: the curved corners 34A formed through chamfering; and the linear sections 34B formed between the adjacent curved corners 34A, 34A. Particularly, since the adjacent linear sections 34B form an angle of 90 degrees therebetween, the rotating knob 31, when rotated by 90 degrees, can be stopped from rotating and fixed between the holding walls 53, 53. In addition, elasticities of the holding walls 53 can be adjusted by changing thicknesses and heights thereof. Here, since the supporting portion 56 is formed in the center of each holding wall 53 in the longitudinal direction, a similar operational feeling can be achieved even when rotating the rotating knob 31 in a different direction. Further, the holding walls 53, 53 allow the connection holding portion 33 of the rotating knob 31 to be connected thereto in a retained manner, the holding walls 53, 53 having curved corners 53W allowing the connection holding portion 33 to be easily inserted therebetween. Furthermore, both sides of each holding wall 53 are connected to the fixing walls 52, 52, thereby achieving a favorable operational feeling even when a load is being applied from the intermediate portion 34. Furthermore, the slit 55 is formed between each holding wall 53 and the lower surface 27K of the step level surface 27 serving as a fixing portion, thereby causing the holding wall 53 to exhibit a favorable elasticity. Furthermore, a left-right width of the inner surface 53N of each holding wall 53 is wider than the distance H of the intermediate portion 34, and a left-right width of a front surface of the supporting portion 56 is narrower than the distance H, thereby making it possible to receive the intermediate portion 34 with a wide area and allowing the supporting portion 56 to undergo elastic deformation under the force applied from the intermediate portion 34, thus achieving a favorable click feeling.

Other effects of the present embodiment are as follows. That is, the vehicle floor mat 1 includes: the mat main body 5; and at least one fastening device 7 for fixing the mat main body 5 to the vehicle. Each fastening device 7 includes the first fastening member 4 fixed to the vehicle, and the second fastening member 6 fixed to the mat main body 5. Here, the first fastening member 4 includes: the rotating knob 31 rotating around a vertical axis; and the lever 41 foldably provided on an upper section of the rotating knob 31. Meanwhile, the second fastening member 6 includes the insertion receiving section 90 allowing the rotating knob 31 to be inserted thereinto, the insertion receiving section 90 further allowing the rotating knob 31 to be engaged therewith as a result of rotating the corresponding rotating knob 31 inserted into the insertion receiving section 90. The rotation of the rotating knob 31 is then regulated by bringing down the lever 41 when the rotating knob 31 is engaged with the insertion receiving section 90. For these reasons, the mat main body 5 can be strongly fixed to the vehicle through the two-step fixation mechanism involving the rotating knob 31 and the lever 41. Further, the second fastening member 6 includes engagement concave sections 93 serving as engagement sections allowing the lever 41 brought down to be engaged therewith. That is, the lever 41, when brought down, can be engaged with one of the engagement concave sections 93 of the second fastening member 6, thus regulating the rotation of the rotating knob 31. Further, since the engagement concave section 93 serves as an engagement section, and the lever 41 brought down can be engaged therewith, a strong fixation becomes possible when bringing down the lever 41 and then allowing the same to be received and held by the engagement concave section 93 of the second fastening member 6. Thus, the rotation of the rotating knob 31 can be regulated, and the mat main body 5 can be fixed without troublesome feeling due to the fact that there are now less protrusions. Further, the lever 41 is formed so long that it fits within the edge 61F of the second fastening member 6 when engaged with the engagement concave section 93, thereby preventing the front end 41S of the lever 41 from protruding therefrom and making it less likely for the front end 41S of the lever 41 to come into contact with passengers' feet, thus allowing the mat main body 5 to be fixed without troublesome feeling. Furthermore, the lever 41 is brought down substantially along the advancement direction S of the vehicle, thereby enabling fixation regardless of whether the lever 41 is brought down forward or backward, thus allowing the second fastening member 6 to be mounted easily. Since the lever 41 is brought down substantially along the advancement direction S of the vehicle, the structure allowing the lever 41 to be brought down forward makes operations at the time of mounting/dismounting easier, whereas the structure allowing the lever 41 to be brought down backward makes locations of passengers' feet less influential when fixing the mat main body 5.

Other effects of the present embodiment are as follows. That is, the lever connecting shaft 37 has the noncircular cross-sectional surface formed into a substantially square shape, and the lever 41 is provided with the lever connecting section 43. Particularly, the lever connecting section 43 is rotatably engaged with the lever connecting shaft 37, thereby allowing the lever 41 to be retained regardless of whether the lever 41 is in a horizontal state (engaged state) in which the lever 41 is engaged with the engagement concave section 93, or a vertical state (non-engaged state) in which the lever 41 is not engaged with the engagement concave section 93. Thus, the lever 41 can be prevented from being inadvertently raised. Further, since there is provided on the rotating knob 31 the lever 41, the rotating knob 31 can be rotated easily when the lever 41 is raised. Meanwhile, the lever 41, when brought down, makes it difficult for the rotating knob 31 to be rotated even when no engagement section is provided.

Second Embodiment

Figures 19A, 19B, 19C:
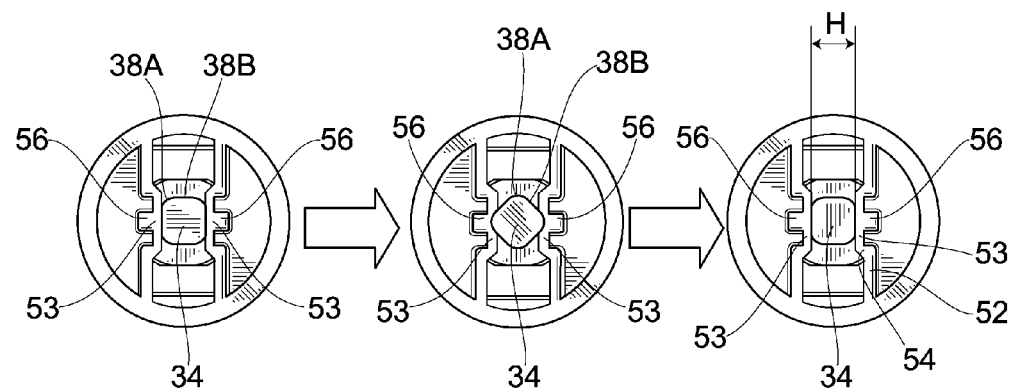
FIG. 19A is a first bottom explanatory view showing how the intermediate portion of the first embodiment is rotated when held by the holding walls.
FIG. 19B is a second bottom explanatory view showing how the intermediate portion of the first embodiment is rotated when held by the holding walls.
FIG. 19C is a third bottom explanatory view showing how the intermediate portion of the first embodiment is rotated when held by the holding walls.
Figure 23:
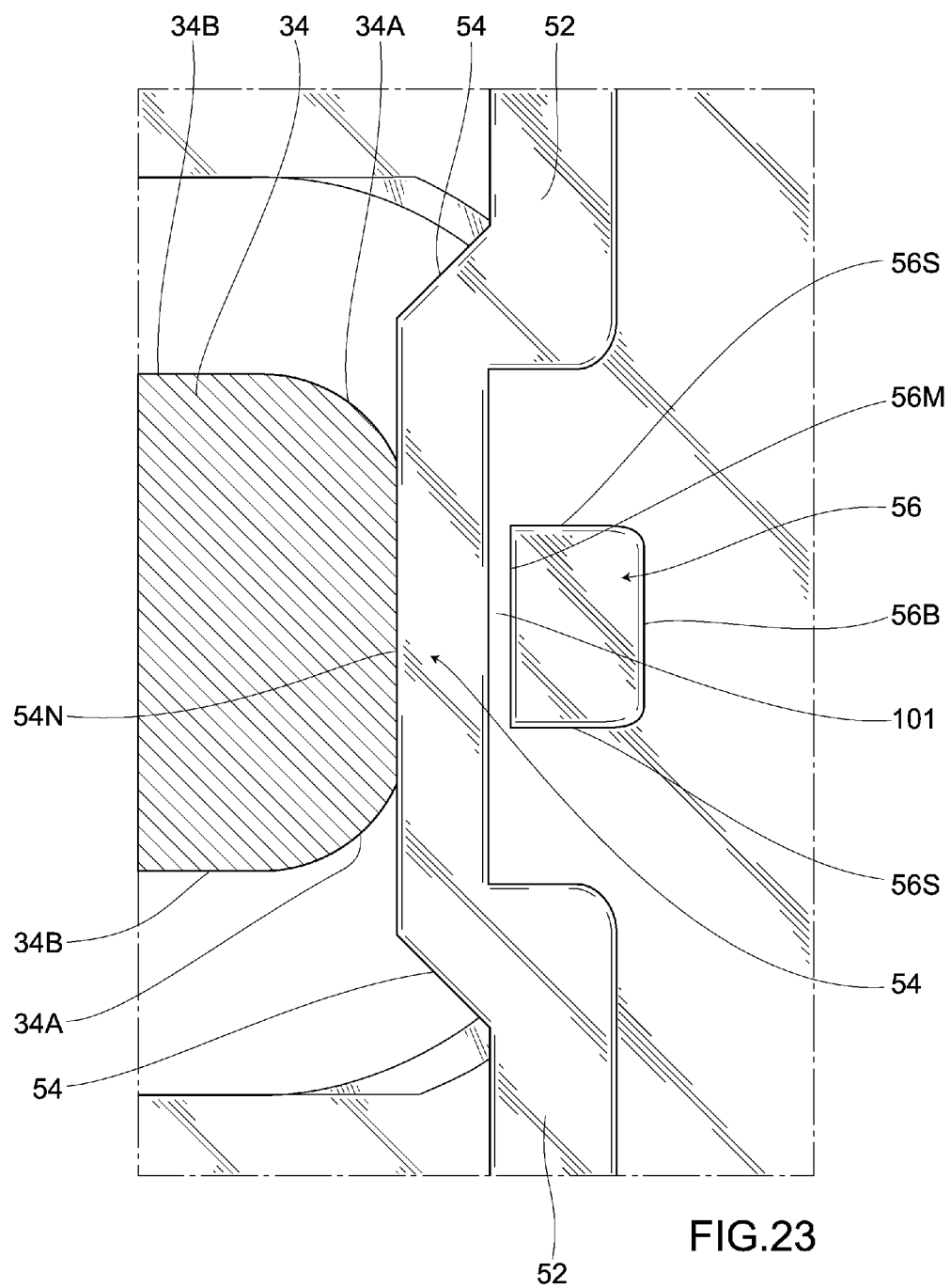
FIG. 23 is an enlarged bottom view showing peripheries of holding walls and supporting portions of a second embodiment of the present invention, that is taken along a cross-sectional surface of an intermediate portion.

A second embodiment of the present invention is shown in FIG. 23. Here, elements identical to those in the first embodiment are given identical symbols, and the descriptions thereof are thereby omitted. In the present embodiment, a gap 101 is provided between a back surface of each holding wall 53 and a front surface 56M of each supporting portion 56. The gap 101 is present in both the locked position and the unlocked position, and the holding wall 53 is not connected to any section except the fixing walls 52 on both sides. As shown in FIG. 19B in which the intermediate portion 34 is in the process of being rotated, the back surfaces of the elastically deformed holding walls 53 are caused to press against the front surfaces 56M of the supporting portions 56, thereby causing the gaps 101 to disappear and the supporting portions 56 to undergo elastic deformation under the force applied from the intermediate portion 34. That is, the supporting portions 56 and the holding walls 53 bring about a favorable operational feeling of the intermediate portion 34.

Here, although the back surface of each holding wall 53 and the front surface 56M of each supporting portion 56 are substantially parallel to each other, a slanting tapered arrangement may also be employed from the perspective of performing diecutting at the time of synthetic resin molding.

Accordingly, the present embodiment exhibits functions and effects that are similar to those of the first embodiment.

Further, according to the present embodiment and as set forth in claim 3, the gap 101 is provided between each holding wall 53 holding the intermediate portion 34 of the rotating knob 31 and each supporting portion 56, thereby making it possible to adjust an operational force by, for example, adjusting the gap 101 and widening a range of adjustment of the operational force of the rotating knob 31 accordingly, thus further improving the degree of freedom of setting the operational feeling.

Third Embodiment

Figure 24:
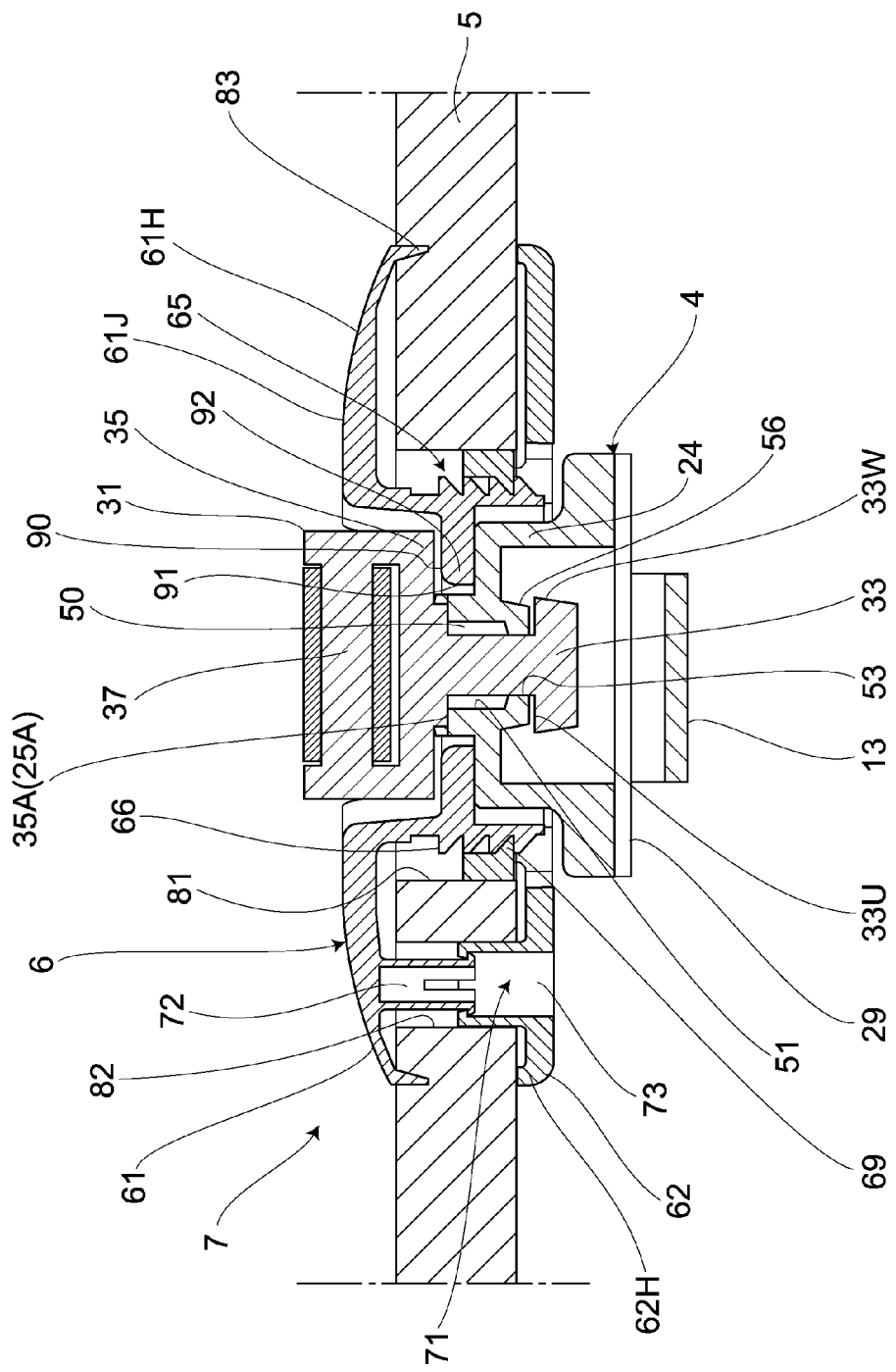
FIG. 24 is an overall cross-sectional view of a third embodiment of the present invention, that is taken along an advancement direction.
Figure 25:
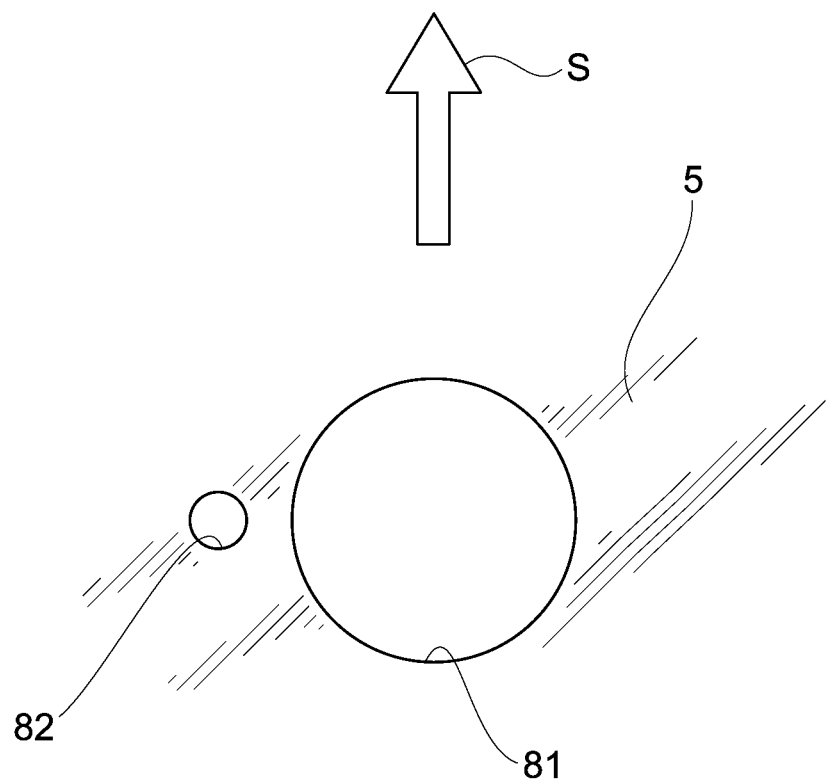
FIG. 25 is a plan view showing a main section of a mat main body of the third embodiment where a center through hole and outer through holes are provided.

A third embodiment is shown in FIG. 24 and FIG. 25. Here, elements identical to those in the aforementioned embodiments are given identical symbols, and the descriptions thereof are thereby omitted. In the present embodiment, the outer connecting portion 71 is provided in one location outside the half body connecting portion 65. Accordingly, the mat main body 5 includes the center through hole 81 and one outer through hole 82 that are bored in the direction substantially orthogonal to the advancement direction S as is the case in the first embodiment. Here, the upper half body 61 employed in the present invention also has the upper surface 61J that is formed into a symmetrical shape.

According to the present embodiment, the second fastening member 6 includes the upper half body 61 and the lower half body 62 that serve to sandwich the mat main body 5. The upper half body 61 and the lower half body 62 are connected to each other through the half body connecting portion 65 allowing the rotating knob 31 to be inserted thereinto, and the outer connecting portion 71 provided outside the half body connecting portion 65. Accordingly, as set forth in claim 1, claim 3 and claim 4, the present embodiment exhibits functions and effects that are similar to those of the first embodiment. Further, as compared to the first embodiment, the present embodiment has the advantage of employing only one outer through hole 82, and is capable of regulating the second fastening member in the front-rear direction through the center through hole 81 and the outer through hole 82.

Fourth Embodiment

A fourth embodiment is shown in FIG. 26 through FIG. 30. Here, elements identical to those in the aforementioned embodiments are given identical symbols, and the descriptions thereof are thereby omitted. As shown in FIG. 26 through FIG. 30, the mat main body 5 includes: a base layer 10A that is made of rubber or the like and disposed at the bottom; and a carpet layer 10B that is made of pile and/or hair and disposed on the top. Here, an upper end of the pile and/or hair is formed as a free end.

Figure 26:
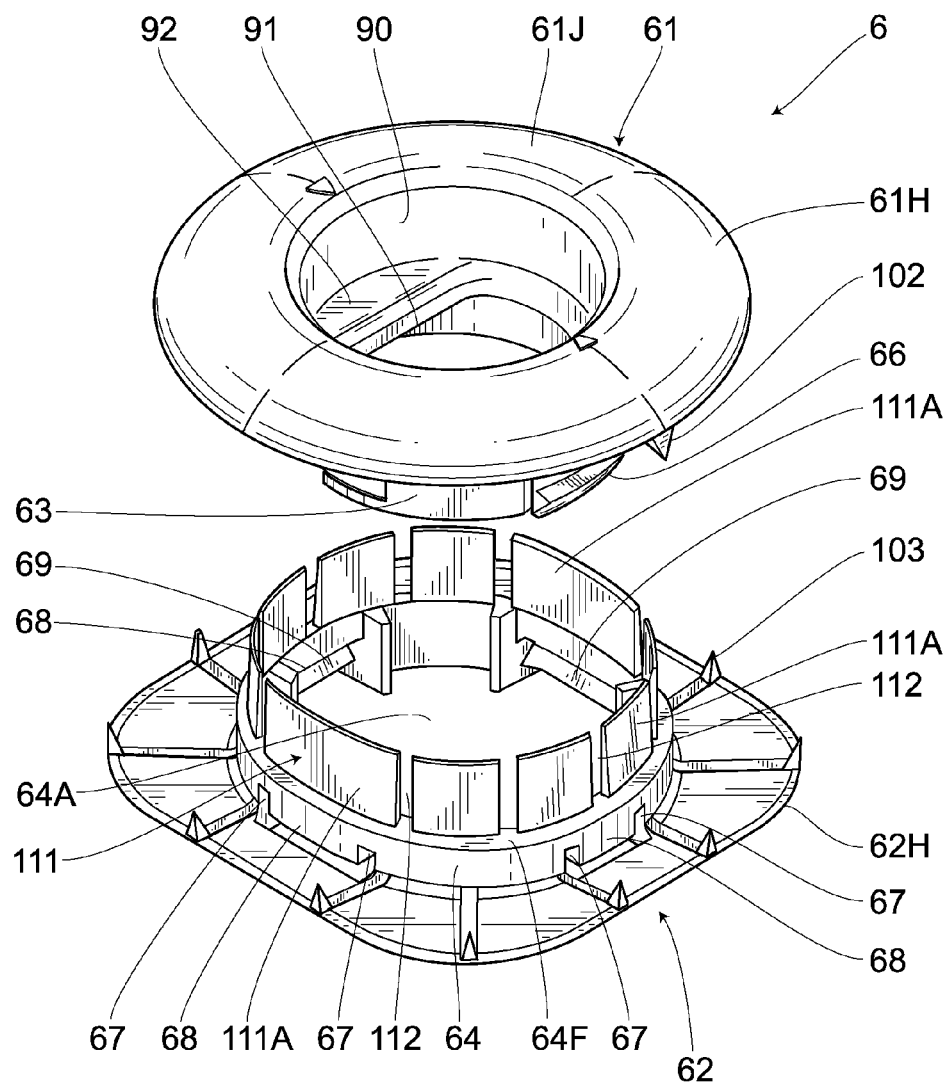
FIG. 26 is an exploded perspective view showing a second fastening member of a fourth embodiment of the present invention.

Next, there is described in detail the second fastening member 6 fixed to the mat main body 5. As shown in FIG. 26, for example, the second fastening member 6 includes the upper half body 61 and the lower half body 62 that serve to vertically sandwich the mat main body 5. The main body 61H serving as a flange of the upper half body 61, is substantially formed into a circular shape with the center portion thereof being formed higher than the periphery thereof. Here, the upper cylindrical connection portion 63 protrudes downward from the center of the main body 61H. Further, the main body 62H serving as a flange of the lower half body 62, is substantially formed into a square shape. Here, the lower cylindrical connection portion 64 connected to the upper cylindrical connection portion 43, protrudes upward from a center of the main body 62H. Particularly, the lower cylindrical connection portion 64 is provided around the opening section 64A of the main body 62H. The upper cylindrical connection portion 63 and the lower cylindrical connection portion 64 compose the half body connecting portion 65.

Figure 30:
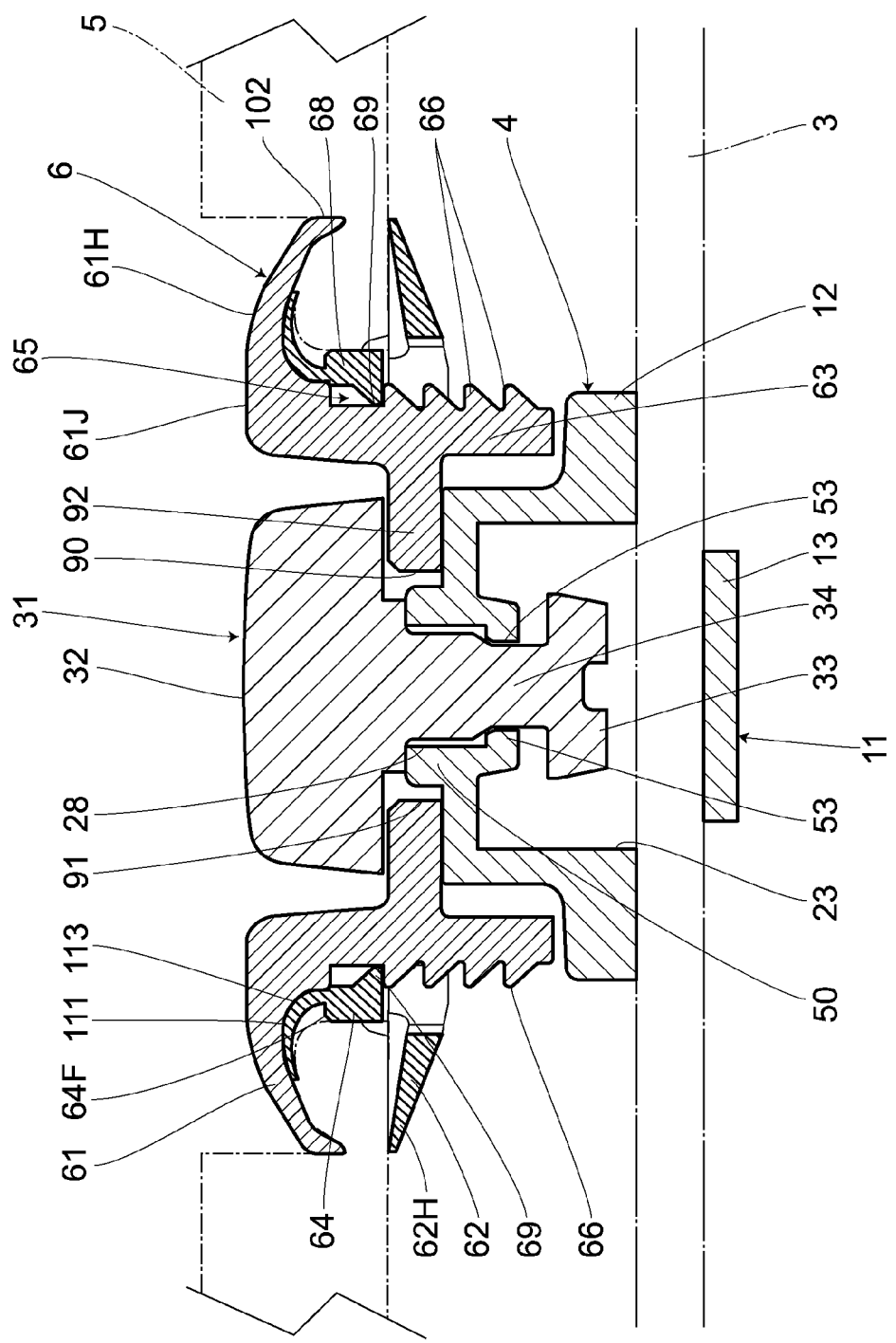
FIG. 30 is a cross-sectional view showing a state in which a fastening device of the fourth embodiment has been assembled.

As shown in FIG. 26 and FIG. 30, the engagement flange portions 66 are circumferentially and vertically provided on the outer circumference of the upper cylindrical connection portion 63, in a multi-row fashion. Particularly, the engagement flange portions 66 have the lower surfaces slanting upward from the inside to the outside, and the upper surfaces that are substantially horizontal. Further, the lower cylindrical connection portion 64 includes the plurality of cutouts 67, 67 provided at intervals in the circumferential direction and having the opened lower ends. Provided between such cutouts 67, 67 are the engagement receiving portions 68 with the lower ends serving as free ends. Each one of the engagement receiving portions 68 includes the engagement claw section 69 provided on the lower end inner surface thereof and allowing each engagement flange portion 66 to be engaged therewith, the engagement claw section 69 having: the upper surface slanting upward from the inside to the outside; and the lower surface that is substantially horizontal. In the present embodiment, four engagement receiving portions 68 are provided at regular intervals in the circumferential direction. Here, the engagement flange portions 66 can be provided either on the whole circumference of the upper cylindrical connection portion 63, or only in the locations corresponding to the engagement claw sections 69.

Therefore, the engagement flange portions 66 and the engagement claw sections 69 are allowed to compose the connector connecting the upper cylindrical connection portion 63 and the lower cylindrical connection portion 64.

Accordingly, as the upper cylindrical connection portion 63 is being inserted into the lower cylindrical connection portion 64, the engagement receiving portions 68 will move outward as a result of elastic deformation, thereby allowing the engagement flange portions 66 in the given locations to be engaged with the engagement claw sections 69 in a retained manner, thus causing the upper and lower cylindrical connection portions 63, 64 to be connected to each other, and conforming to a thickness of the mat main body 5 by changing the location of engagement.

An extending portion 111 is provided around an opening edge 64F of the lower cylindrical connection portion 64. Specifically, the extending portion 111 substantially protrudes from the entire circumference of the lower cylindrical connection portion 64. Further, the extending portion 111 is provided with a plurality of slits 112 formed at intervals in the circumferential direction, the slits 112 dividing the extending portion 111 into a plurality of divided extending portions 111A. Here, upper ends of the divided extending portions 111A are on the same level. That is, the vertical slits 112 separate the divided extending portions 111A from one another. The extending portion 111 is formed thinner than the lower cylindrical connection portion 64, thus being flexible. Here, a base end side of the extending portion 111 is disposed in an inner circumferential section of the opening edge 64F of the lower cylindrical connection portion 64, in a thickness direction. Further, the extending portion 111 is so formed that it gradually becomes thinner toward a front end side thereof from the base end side. Particularly, the extending portion 111 includes an inner surface that is substantially vertical; and an outer surface slightly slanting inward toward the front end side. Further, it is preferred that the interval between the adjacent slits 112, 112 be not larger than 60 degrees in the circumferential direction of the lower cylindrical connection portion 64, from the perspective of allowing the divided extending portions 111A to exhibit given flexibilities. Furthermore, it is also preferred that a width of each slit 112 be formed thinner than the pile of the carpet layer 10B.

A through hole 101 allowing the half body connecting portion 65 to be inserted therethrough, is bored in the mat main body 5. Here, since the half body connecting portion 65 is formed inside the through hole 101, the second fastening member 6 is allowed to be fixed to the mat main body 5 with the mat main body 5 being sandwiched by the upper and lower half bodies 61, 62.

Figure 27:
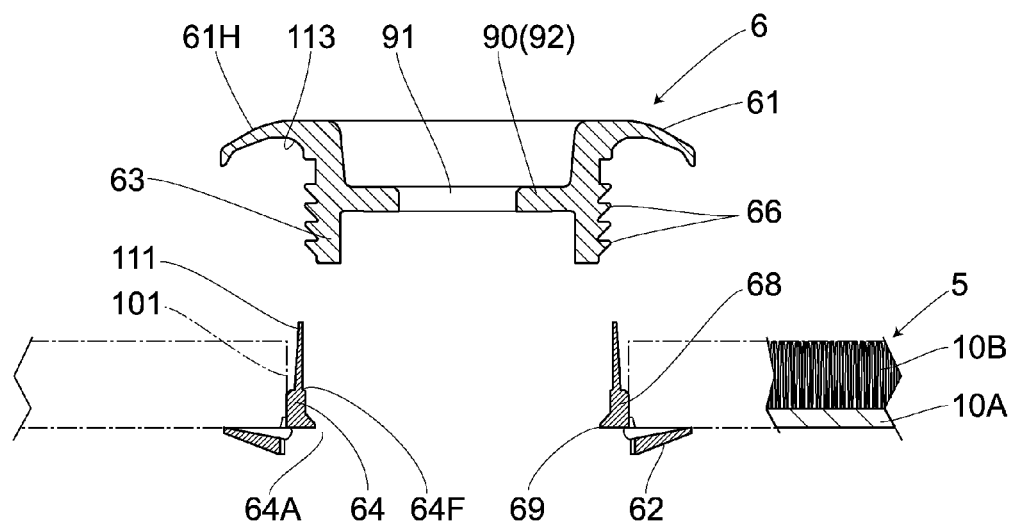
FIG. 27 is a cross-sectional view explaining a method for assembling the second fastening member of the fourth embodiment.

A preferable height of the extending portion 111 is described hereunder. As shown in FIG. 27, the lower cylindrical connection portion 64 is inserted into the through hole 101 from a side of the base layer 10A of the mat main body 5. Here, the extending portion 111 is formed so high that the front end thereof protrudes from a first end surface of the mat main body 5 with a periphery of the main body 62H of the lower half body 62 abutting against the base layer 10A. Further, a bended guiding section 113 is provided on an inner surface of the main body 61H of the upper half body 61, the bended guiding section 113 being formed around the upper cylindrical connection portion 63 and as a concave and curved surface.

Further, as shown in FIG. 26 and FIG. 27, for example, a plurality of pins 102 to be inserted into and engaged with the mat main body 5, are provided on a periphery of a lower surface of the main body 61H of the upper half body 61. Meanwhile, a plurality of pins 103 to be inserted into and engaged with the mat main body 5, are provided on a periphery of an upper surface of the main body 62H of the lower half body 62. These pins 102, 103 allow the second fastening member 6 to be fixed to the mat main body 5 in a whirl-stop fashion.

Further, there is formed inside the upper cylindrical connection portion 63 the insertion receiving section 90 allowing the rotating knob 31 serving as the retainer to be engaged therewith. The insertion receiving section 90 includes: the elongated receiving hole 91 that is provided inside and smaller than the upper cylindrical connection portion 63; and the engagement receiving section 92 that is formed into the shape of a division plate and provided on both sides of the elongated receiving hole 91 in a width direction. Here, the elongated receiving hole 91 is formed so large that it allows the operable portion 32 of the rotating knob 31 to be inserted therethrough. Particularly, an upper section of the knob receiving section 50 is to be inserted into and engaged with the elongated receiving hole 91 from the bottom, followed by rotating the rotating knob 31 under such condition so as to allow the operable portion 32 in the locked position to be engaged with upper surfaces of the engagement receiving sections 92.

There is described hereunder a method for attaching the second fastening member 6 to the mat main body 5. As shown in FIG. 27, the front end of the extending portion 111 protrudes from the upper surface of the mat main body 5 after inserting the lower cylindrical connection portion 64 into the through hole 101 from a lower surface side of the mat main body 5. Next, the upper cylindrical connection portion 63 of the upper half body 61 is inserted into the lower cylindrical connection portion 64 through the extending portion 111 from an upper surface side of the mat main body 5, thereby causing the engagement claw section 69 to be engaged with the engagement flange portions 66 in a retained manner, thus allowing the upper half body 61 and the lower half body 62 to be connected to each other as a result of connecting the upper and lower cylindrical connection portions 63, 64 to each other. Since the upper cylindrical connection portion 63 is thus inserted into the lower cylindrical connection portion 64 through the extending portion 111, the pile of the carpet layer 10B will neither fall into the through hole 101 nor be caught between the upper and lower cylindrical connection portions 63, 64.

Figure 28:
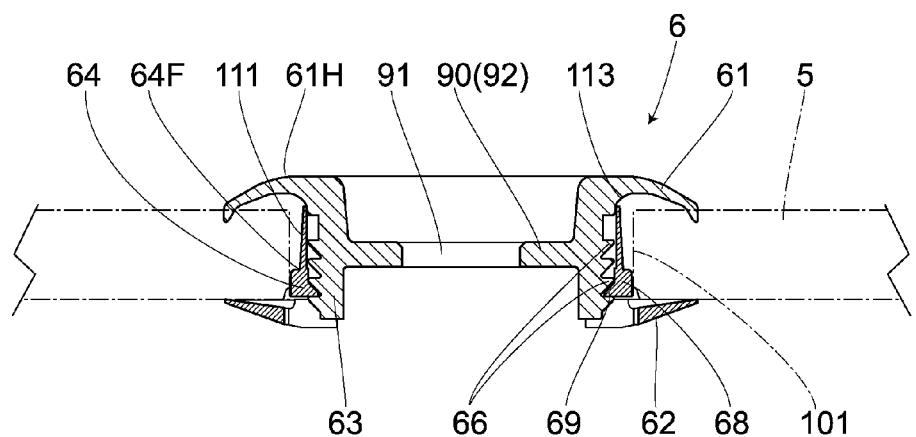
FIG. 28 is a cross-sectional view explaining the method for assembling the second fastening member of the fourth embodiment, in which an engagement claw section is engaged with a lower engagement flange portion.
Figure 29:
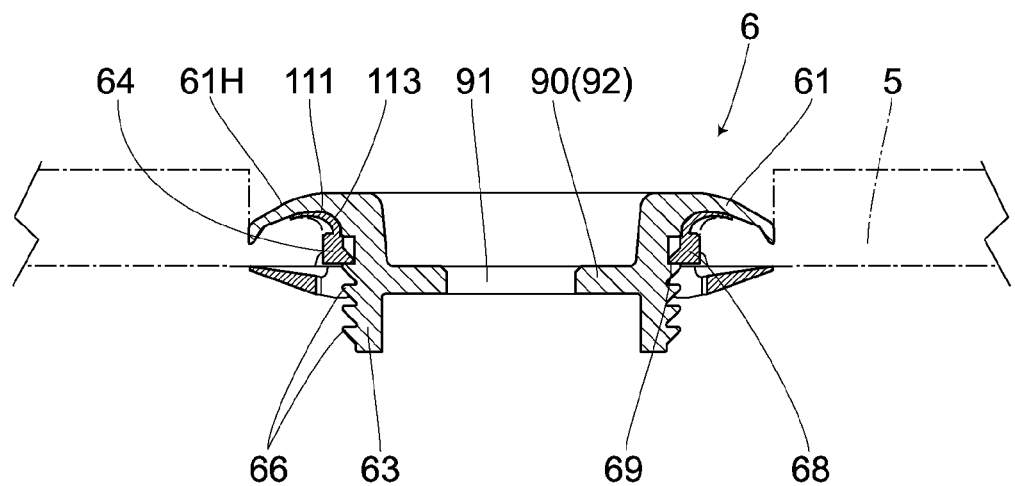
FIG. 29 is a cross-sectional view explaining the method for assembling the second fastening member of the fourth embodiment, in which the engagement claw section is engaged with an upper engagement flange portion.

As the upper cylindrical connection portion 63 is further pushed from a state shown in FIG. 28, the engagement claw section 69 is caused to engage with the engagement flange portions 66 at a different level, thereby allowing the extending portion 111 to be bended along the bended guiding section 113 and stretch outward, thus causing the corresponding extending portion 111 to fit in an inner side of the main body 61H. Accordingly, the present embodiment can be used in mat main bodies 5 of different thicknesses without exposing the extending portion 111 outward from the second fastening member 6. In FIG. 30, the extending portion 111 is bended by 90 degrees or more.

As mentioned above, the vehicle floor mat 1 of the present embodiment includes: the mat main body 5; and at least one fastening device 7 for fixing the mat main body 5 to the vehicle. Particularly, the fastening device 7 includes the first fastening member 4 fixed to the vehicle and the second fastening member 6 fixed to the mat main body 5. Here, the first fastening member 4 is provided with the vertical rotating knob 31 serving as the retainer, whereas the second fastening member 6 is provided with the insertion receiving section 90 allowing the rotating knob 31 to be inserted thereinto and held thereby. The second fastening member 6 further includes: the upper half body 61 and the lower half body 62 that serve to sandwich the mat main body 5; and the pair of the upper and lower cylindrical connection portions 63, 64 that are respectively provided on the upper half body 61 and the lower half body 62. Here, the through hole 101 provided on the mat main body 5 allows both the upper and lower cylindrical connection portions 63, 64 to be connected to each other therein, so as to allow the upper half body 61 and the lower half body 62 to be connected to each other. The rotating knob 31 is inserted into the pair of the upper and lower cylindrical connection portions 63, 64, and the extending portion 111 is provided around the opening edge 64F of the lower cylindrical connection portion 64 which is one of the upper and lower cylindrical connection portions 63, 64. Since the extending portion 111 can be bended when engaging the two half bodies 61, 62 with each other, the pile of the mat main body 5 holding the second fastening member 6 is prevented from being caught, thus making it easy to attach the first and second fastening members 4, 6.

Further, according to the present embodiment, the upper cylindrical connection portion 63 serving as an other cylindrical connection portion can be inserted into the lower cylindrical connection portion 64 which is one of the cylindrical connection portions and provided with the extending portion 111. Particularly, the upper half body 61 serving as an other half body is provided with the bended guiding section 113 allowing the extending portion 111 to be bended therealong when engaging the two half bodies 61, 62 with each other. Accordingly, since the extending portion 111 for pile capture prevention can be bended along the bended guiding section 113 of the second fastening member 6, not only the pile can be prevented from being caught, but an appearance can also be improved with the extending portion 111 fitting in the second fastening member 6.

Furthermore, according to the present embodiment, the extending portion 111 is formed so high that the front end thereof protrudes from an upper surface, i.e., the first end surface of the mat main body 5 with the lower cylindrical connection portion 64 being inserted into the through hole 101 from a lower surface, i.e., a second end surface of the mat main body 5. That is, the extending portion 111 is formed higher than the thickness of the mat main body 5, thus reliably preventing the pile from being caught.

Effects of the present embodiment are as follows. The extending portion 111 is to be inserted into the through hole 101 from the base layer 10A side that is opposite to the carpet layer 10B side, thereby preventing the pile from being brought down through insertion. Further, the extending portion 111 is divided into the plurality of the divided extending portions 111A by the slits 112 serving as separators, thereby allowing the extending portion 111 to be smoothly bended and stretch circumferentially when connecting the two half bodies 61, 62 to each other. Furthermore, the extending portion 111 is so formed that it gradually becomes thinner toward the front end side thereof from the base end side, thus being easily bended along the bended guiding section 113. Furthermore, since the extending portion 111 is integrally formed on the lower half body 62 made of synthetic resin, it can be provided at low cost.

Fifth Embodiment

Figure 31:
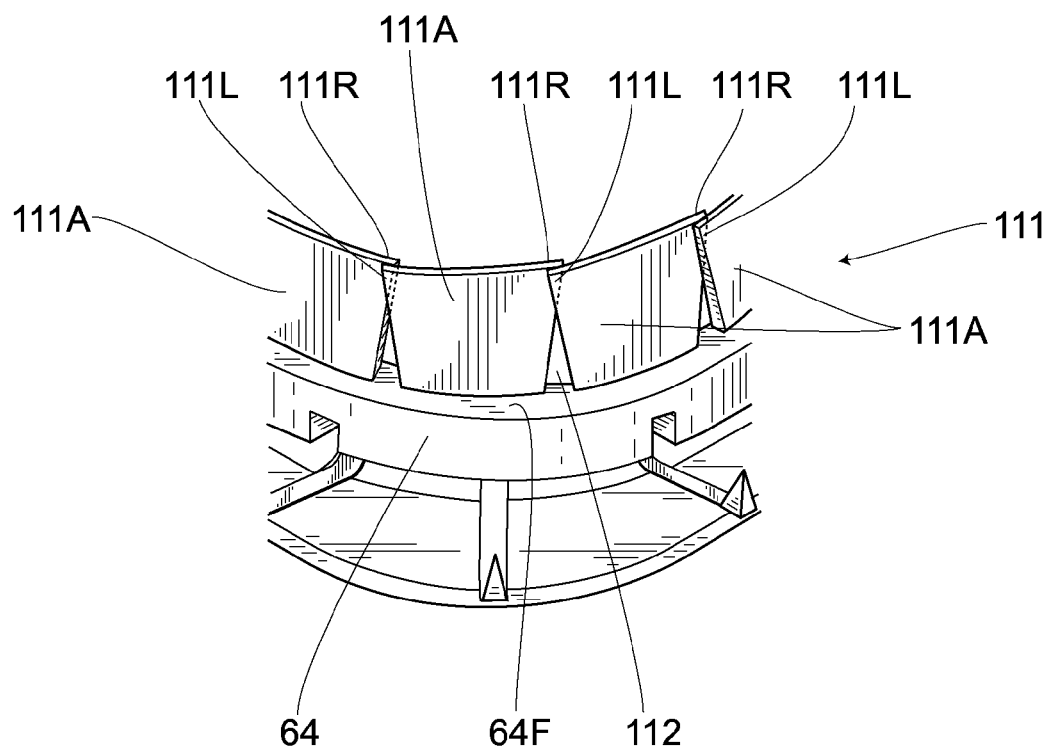
FIG. 31 is a front view showing an extending portion of a fifth embodiment of the present invention.

A fifth embodiment of the present invention is shown in FIG. 31. Here, elements identical to those in the aforementioned embodiments are given identical symbols, and the descriptions thereof are thereby omitted. The extending portion 111 of the present embodiment is formed as follows. That is, while an upper section of each divided extending portion 111A is formed wider in the circumferential direction, upper edges of the adjacent divided extending portions 111A, 111A are placed on top of or below one another in an unconnected fashion so as to cover upper sections of the slits 112. Particularly, each divided extending portion 111A is formed into a shape of a trapezoid having a longer upper base. Here, a one side edge 111L formed on one of left and right sides of the upper base, is placed on either an outer surface or an inner surface of an other side edge 111R of an adjacent divided extending portion 111A. Accordingly, the one side edge 111L and the other side edge 111R thus placed on top of or below one another, serve to cover the upper sections of the slits 112.

Therefore, the present embodiment exhibits functions and effects that are similar to those of the first embodiment. Further, the present embodiment allows the upper edges of the adjacent divided extending portions 111A to be placed on top of or below one another so as to cover at least the upper sections of the slits 112, thereby preventing the pile from entering the slits 112 even when a thin pile is used in the carpet layer 10B, thus allowing the second fastening member 6 to be attached easily.

Effects of the present embodiment are as follows. That is, the adjacent divided extending portions 111A in a left-right direction interact with each other in a manner such that the one side edge 111L and the other side edge 111R that are formed on the left and right sides of the upper base, are respectively placed on the outer surface of the other side edge 111R and the inner surface of the one side edge 111L. Therefore, the plurality of the divided extending portions 111A, 111A can be uniformly bended by means of the bended guiding section 113.

However, the present invention is not limited to the aforementioned embodiments. In fact, various modified embodiments are possible within the scope of the gist of the present invention. For example, although the aforementioned embodiments employ engagement concave sections serving as engagement sections allowing the lever to be engaged therewith, the lever may also be engaged with a convex section that is one step higher than the upper surface of the upper half body, the convex section serving as an engagement section preventing rotation in such case. Further, although the aforementioned embodiments allow the lever to be brought down both forward and backward, there may be employed a structure allowing the lever raised to be brought down either forward or backward. Furthermore, although the aforementioned embodiments employ the lever of a plate shape, there may also be employed, for example, a lever of a stick shape or a lever having a triangular cross-sectional surface. Furthermore, although the aforementioned embodiments employ curved corners formed by chamfering the corners of the cross-sectional surfaces, chamfering performed in a linear fashion is also acceptable. Furthermore, although the aforementioned embodiments employ the holding walls of uniform thicknesses, there may also be employed a type of holding wall whose thickness differs from part to part, or a type of holding wall whose thickness changes. Furthermore, although the aforementioned embodiments employ the half body connecting portion and the outer connecting portions that have circular cross-sectional surfaces, the cross-sectional surfaces of the half body connecting portion and the outer connecting portions may also be formed into, for example, oval shapes or substantially angular shapes.

As the retainer, although the aforementioned embodiments employ the rotating knob allowing the first fastening member to be positioned in a planar direction and a vertical direction, there can also be used a pin-shaped member inserted into the insertion receiving section and allowing the first fastening member to be positioned in the planar direction. Further, as the separators, although the aforementioned embodiments employ the slits that are continuous in the vertical direction, there can also be used perforated cuts or thin-walled sections that are thinner than other sections of the extending portion. Particularly, the extending portion stretching outward along the bended guiding section causes the thin-walled sections to be split starting from upper sections thereof, thereby separating the adjacent divided extending portions from one another. Further, the divided extending portions may also be formed into substantial T shapes with edges on upper ends thereof being placed on top of or below one another. Furthermore, the cylindrical connection portion provided with the extending portion may also be inserted into the through hole from the carpet layer side.

What is claimed:
1. A vehicle floor mat comprising:
a mat main body; and
at least one fastening device for fastening said mat main body to a vehicle,
wherein said fastening device comprises:
at least one first fastening member fixed to the vehicle, said first fastening member having a vertical retainer provided thereon; and
at least one second fastening member fixed to said mat main body,
wherein said second fastening member comprises:
an insertion receiving section for said retainer to be inserted thereinto in a manner capable of being held thereby;
an upper half body and a lower half body configured to sandwich said mat main body;
first and second cylindrical connection portions separately provided on either one of said upper half body and said lower half body, and are connected to each other in a through hole in said mat main body to connect said upper half body and said lower half body to thereby allow said retainer to be inserted into said cylindrical connection portions; and an extending portion provided around an opening edge of said second cylindrical connection portion, said extending portion being bended when engaging said upper and lower half bodies with each other.

2. The vehicle floor mat according to claim 1, wherein said first cylindrical connection portion is capable of being inserted into said second cylindrical connection portion provided with said extending portion, and a bended guiding section is provided on one of said upper and lower half bodies so that said extending portion is bended along the bended guiding section when engaging said upper and lower half bodies with each other.

3. The vehicle floor mat according to claim 1, wherein said extending portion is formed to a height allowing a front end thereof to protrude from a first end surface of said mat main body when said second cylindrical connection portion provided with said extending portion is inserted into the through hole from a second end surface of said mat main body.

4. The vehicle floor mat according to claim 2, wherein said extending portion is formed to a height allowing a front end thereof to protrude from a first end surface of said mat main body when said second cylindrical connection portion provided with said extending portion is inserted into the through hole from a second end surface of said mat main body.

5. The vehicle floor mat according to claim 1, wherein said extending portion substantially protrudes from an entire circumference of said second cylindrical connection portion, and is provided with a plurality of slits formed at intervals in a circumferential direction with said slits dividing said extending portion into a plurality of divided extending portions.

6. The vehicle floor mat according to claim 2, wherein said extending portion substantially protrudes from an entire circumference of said second cylindrical connection portion, and is provided with a plurality of slits formed at intervals in a circumferential direction, with said slits dividing said extending portion into a plurality of divided extending portions.

7. The vehicle floor mat according to claim 3, wherein said extending portion substantially protrudes from an entire circumference of said second cylindrical connection portion, and is provided with a plurality of slits formed at intervals in a circumferential direction, with said slits dividing said extending portion into a plurality of divided extending portions.

8. The vehicle floor mat according to claim 4, wherein said extending portion substantially protrudes from an entire circumference of said second cylindrical connection portion, and is provided with a plurality of slits formed at intervals in a circumferential direction, with said slits dividing said extending portion into a plurality of divided extending portions.

9. The vehicle floor mat according to claim 1, wherein said extending portion gradually becomes thinner toward a front end side thereof from a base end side.

10. The vehicle floor mat according to claim 2, wherein said extending portion gradually becomes thinner toward a front end side thereof from a base end side.

11. The vehicle floor mat according to claim 3, wherein said extending portion gradually becomes thinner toward a front end side thereof from a base end side.

12. The vehicle floor mat according to claim 4, wherein said extending portion gradually becomes thinner toward a front end side thereof from a base end side.

13. The vehicle floor mat according to claim 5, wherein said extending portion gradually becomes thinner toward a front end side thereof from a base end side.

14. The vehicle floor mat according to claim 6, wherein said extending portion gradually becomes thinner toward a front end side thereof from a base end side.

15. The vehicle floor mat according to claim 7, wherein said extending portion gradually becomes thinner toward a front end side thereof from a base end side.

16. The vehicle floor mat according to claim 8, wherein said extending portion gradually becomes thinner toward a front end side thereof from a base end side.

17. The vehicle floor mat according to claim 5, wherein an upper section of each divided extending portion is formed into a shape of a trapezoid having a longer upper base.

18. The vehicle floor mat according to claim 6, wherein an upper section of each divided extending portion is formed into a shape of a trapezoid having a longer upper base.

19. The vehicle floor mat according to claim 7, wherein an upper section of each divided extending portion is formed into a shape of a trapezoid having a longer upper base.

20. The vehicle floor mat according to claim 8, wherein an upper section of each divided extending portion is formed into a shape of a trapezoid having a longer upper base.

* * * * *